(12) United States Patent
van Beek et al.

(10) Patent No.: US 8,018,850 B2
(45) Date of Patent: Sep. 13, 2011

(54) WIRELESS VIDEO TRANSMISSION SYSTEM

(75) Inventors: Petrus J. L. van Beek, Camas, WA (US); Sachin Govind Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1295 days.

(21) Appl. No.: 10/830,472

(22) Filed: Apr. 21, 2004

(65) Prior Publication Data

US 2005/0188407 A1 Aug. 25, 2005

Related U.S. Application Data

(60) Provisional application No. 60/547,231, filed on Feb. 23, 2004.

(51) Int. Cl.
*H04B 7/212* (2006.01)
(52) U.S. Cl. ............... 370/232; 370/333; 375/240.02
(58) Field of Classification Search .......... 370/230–253, 370/395.63, 431, 465, 260, 421, 444, 445, 370/449, 450, 455, 459, 328, 312, 315, 338, 370/468, 320, 389; 725/81, 62, 95, 67, 96, 725/116; 455/412.2, 556.1, 81; 709/223, 709/231; 375/240.2
See application file for complete search history.

(56) References Cited

U.S. PATENT DOCUMENTS

| | | | |
|---|---|---|---|
| 5,159,447 A | 10/1992 | Haskell et al. | |
| 5,455,823 A * | 10/1995 | Noreen et al. | 370/312 |
| 5,506,686 A | 4/1996 | Auyeung et al. | |
| 5,541,852 A | 7/1996 | Eyuboglu et al. | |
| 5,546,377 A | 8/1996 | Ozveren | |
| 5,548,581 A | 8/1996 | Makrucki | |
| 5,592,470 A * | 1/1997 | Rudrapatna et al. | 370/320 |
| 5,742,594 A | 4/1998 | Natarajan | |
| 5,936,940 A | 8/1999 | Marin et al. | |
| 5,978,236 A | 11/1999 | Faberman et al. | |
| 5,982,778 A | 11/1999 | Mangin et al. | |
| 5,995,705 A | 11/1999 | Lang | |
| 6,014,694 A | 1/2000 | Aharoni et al. | |
| 6,049,549 A | 4/2000 | Ganz et al. | |
| 6,055,578 A | 4/2000 | Williams et al. | |
| 6,167,084 A * | 12/2000 | Wang et al. | 375/240.02 |
| 6,167,253 A * | 12/2000 | Farris et al. | 455/412.2 |
| 6,233,226 B1 | 5/2001 | Gringeri et al. | |
| 6,263,503 B1 | 7/2001 | Margulis | |
| 6,275,497 B1* | 8/2001 | Varma et al. | 370/431 |
| 6,275,531 B1 | 8/2001 | Li | |
| 6,292,834 B1 | 9/2001 | Ravi et al. | |

(Continued)

FOREIGN PATENT DOCUMENTS

EP 1026855 10/1999

(Continued)

OTHER PUBLICATIONS

"IEEE Wireless LAN Edition: A compilation based on IEEE Std 802.11-1999 (R2003) and its amendments," IEEE Standards Information Network, IEEE Press, Copyright 2003.

(Continued)

*Primary Examiner* — Aung S Moe
*Assistant Examiner* — Vinncelas Louis
(74) *Attorney, Agent, or Firm* — Chernoff, Vilhauer, McClung & Stenzel

(57) ABSTRACT

A transmission systems suitable for video.

30 Claims, 26 Drawing Sheets

U.S. PATENT DOCUMENTS

| | | | |
|---|---|---|---|
| 6,300,665 B1 | 10/2001 | Peeters et al. | |
| 6,310,495 B1 | 10/2001 | Zhang | |
| 6,343,085 B1 | 1/2002 | Krishnan et al. | |
| 6,351,153 B1 | 2/2002 | Fischer | |
| 6,363,056 B1 | 3/2002 | Beigi et al. | |
| 6,434,606 B1 | 8/2002 | Borella et al. | |
| 6,456,591 B1 | 9/2002 | Mishra | |
| 6,459,811 B1 | 10/2002 | Hurst, Jr. | |
| 6,496,481 B1 * | 12/2002 | Wu et al. | 370/242 |
| 6,542,467 B2 | 4/2003 | Umayabashi | |
| 6,587,875 B1 | 7/2003 | Ogus | |
| 6,590,936 B1 | 7/2003 | Kadono | |
| 6,598,228 B2 | 7/2003 | Hejna | |
| 6,600,720 B1 | 7/2003 | Gvozdanovic | |
| 6,665,751 B1 | 12/2003 | Chen et al. | |
| 6,700,869 B1 | 3/2004 | Falco et al. | |
| 6,741,565 B1 | 5/2004 | Wicklund | |
| 6,747,991 B1 | 6/2004 | Hemy et al. | |
| 6,920,179 B1 * | 7/2005 | Anand et al. | 375/240.26 |
| 6,959,448 B1 | 10/2005 | Seo | |
| 6,986,158 B1 * | 1/2006 | Terui et al. | 725/116 |
| 6,988,144 B1 | 1/2006 | Luken et al. | |
| 7,016,409 B2 * | 3/2006 | Unger | 375/240.02 |
| 7,099,398 B1 * | 8/2006 | Girardeau et al. | 375/265 |
| 7,257,094 B2 * | 8/2007 | Shoemake | 370/311 |
| 7,391,717 B2 * | 6/2008 | Klemets et al. | 370/324 |
| 7,475,129 B2 * | 1/2009 | Rajamony | 709/223 |
| 7,613,153 B2 * | 11/2009 | Chandra et al. | 370/338 |
| 7,657,645 B2 * | 2/2010 | Xu | 709/231 |
| 2001/0047423 A1 | 11/2001 | Shao et al. | |
| 2002/0010938 A1 | 1/2002 | Zhang et al. | |
| 2002/0054578 A1 | 5/2002 | Zhang et al. | |
| 2002/0075857 A1 | 6/2002 | LeBlanc | |
| 2002/0085587 A1 | 7/2002 | Mascolo | |
| 2002/0101880 A1 | 8/2002 | Kim | |
| 2002/0114393 A1 | 8/2002 | Vleeschouwer | |
| 2002/0126891 A1 | 9/2002 | Osberger | |
| 2002/0136298 A1 | 9/2002 | Anantharamu et al. | |
| 2002/0140851 A1 | 10/2002 | Laksono | |
| 2002/0169880 A1 | 11/2002 | Loguinov et al. | |
| 2002/0186660 A1 | 12/2002 | Bahadiroglu | |
| 2003/0016630 A1 * | 1/2003 | Vega-Garcia et al. | 370/252 |
| 2003/0035133 A1 * | 2/2003 | Berkema et al. | 358/1.15 |
| 2003/0067872 A1 | 4/2003 | Harrell et al. | |
| 2003/0067877 A1 | 4/2003 | Sivakumar et al. | |
| 2003/0095594 A1 | 5/2003 | Laksono et al. | |
| 2003/0101274 A1 | 5/2003 | Yi et al. | |
| 2003/0152032 A1 | 8/2003 | Yanagihara et al. | |
| 2003/0189589 A1 | 10/2003 | LeBlanc et al. | |
| 2003/0229902 A1 * | 12/2003 | Moni | 725/95 |
| 2003/0231655 A1 * | 12/2003 | Kelton et al. | 370/468 |
| 2004/0017773 A1 | 1/2004 | Piche et al. | |
| 2004/0045030 A1 | 3/2004 | Reynolds et al. | |
| 2004/0057381 A1 | 3/2004 | Tseng et al. | |
| 2004/0062207 A1 | 4/2004 | Gross | |
| 2004/0071096 A1 * | 4/2004 | Na et al. | 370/252 |
| 2004/0086268 A1 | 5/2004 | Radha et al. | |
| 2004/0141503 A1 * | 7/2004 | Sinha | 370/389 |
| 2004/0153951 A1 | 8/2004 | Walker et al. | |
| 2004/0170186 A1 | 9/2004 | Shao et al. | |
| 2004/0177377 A1 * | 9/2004 | Lin et al. | 725/81 |
| 2004/0190515 A1 | 9/2004 | Nogima et al. | |
| 2004/0194142 A1 * | 9/2004 | Jiang et al. | 725/96 |
| 2004/0204041 A1 * | 10/2004 | Fillebrown et al. | 455/556.1 |
| 2004/0223551 A1 * | 11/2004 | Hannuksela | 375/240.25 |
| 2004/0252758 A1 * | 12/2004 | Katsavounidis et al. | 375/240.2 |
| 2004/0252759 A1 | 12/2004 | John Winder et al. | |
| 2004/0255328 A1 | 12/2004 | Baldwin et al. | |
| 2005/0007956 A1 | 1/2005 | Nilsson et al. | |
| 2005/0041689 A1 | 2/2005 | Wu et al. | |
| 2005/0055201 A1 | 3/2005 | Florencio et al. | |
| 2005/0094622 A1 | 5/2005 | Mallila | |
| 2005/0105469 A1 * | 5/2005 | Hao | 370/235 |
| 2005/0152465 A1 * | 7/2005 | Maltsev et al. | 375/260 |
| 2005/0169174 A1 | 8/2005 | Apostolopoulos et al. | |
| 2005/0169209 A1 * | 8/2005 | Miu et al. | 370/328 |
| 2005/0195821 A1 | 9/2005 | Yun et al. | |
| 2005/0213502 A1 | 9/2005 | Convertino et al. | |
| 2005/0216950 A1 | 9/2005 | MacInnis | |
| 2006/0045020 A1 | 3/2006 | Picco et al. | |
| 2006/0077993 A1 | 4/2006 | Pereira et al. | |
| 2006/0136970 A1 * | 6/2006 | Salomons | 725/81 |
| 2006/0165166 A1 | 7/2006 | Chou et al. | |
| 2006/0198392 A1 | 9/2006 | Park et al. | |
| 2006/0276143 A1 * | 12/2006 | Anglin, Jr. | 455/81 |
| 2007/0030819 A1 * | 2/2007 | Bichot et al. | 370/315 |
| 2007/0064722 A1 | 3/2007 | Fang | |
| 2007/0263657 A1 * | 11/2007 | Sugar et al. | 370/465 |
| 2008/0117915 A1 | 5/2008 | Khirman | |
| 2008/0259792 A1 * | 10/2008 | Cimini et al. | 370/230.1 |

FOREIGN PATENT DOCUMENTS

| | | |
|---|---|---|
| EP | 1047223 A2 | 4/2000 |
| EP | 1047223 A3 | 4/2000 |
| EP | 1179925 A2 | 8/2001 |
| EP | 1179925 A3 | 8/2001 |
| EP | 0699368 | 7/2002 |
| EP | 1300046 | 4/2003 |
| EP | 1536582 | 6/2005 |
| GB | 2367219 | 3/2002 |
| JP | 6-338918 | 12/1994 |
| JP | 10-200494 | 7/1998 |
| JP | 11-215480 | 8/1999 |
| JP | 2000/308023 | 11/2000 |
| JP | 2001-223716 | 8/2001 |
| JP | 2002/058002 | 2/2002 |
| JP | 2002-94567 A | 3/2002 |
| JP | 2002-217965 | 8/2002 |
| JP | 2003-008487 | 1/2003 |
| JP | 2003-32316 | 1/2003 |
| JP | 2003-37649 | 2/2003 |
| JP | 2003-204342 | 7/2003 |
| WO | WO 01/39508 A1 | 5/2001 |
| WO | WO 02/03609 A2 | 1/2002 |
| WO | WO 02/03609 A3 | 1/2002 |
| WO | WO 02/087276 A2 | 10/2002 |
| WO | WO 02/087276 A3 | 10/2002 |
| WO | WO 02/101513 | 12/2002 |
| WO | WO 03/003630 | 1/2003 |
| WO | WO 03/009581 | 1/2003 |
| WO | WO 03/032643 | 4/2003 |
| WO | WO 03/075021 | 9/2003 |
| WO | WO 03/096698 | 11/2003 |
| WO | WO 2004/062291 | 7/2004 |

OTHER PUBLICATIONS

Draft Amendment to IEEE Std. 802.11 (1999 Edition), Part 11: MAC and PHY specifications: Medium Access Control (MAC) Quality of Service (QoS) Enhancements, IEEE P802.11e/D8.0, Feb. 2004.

Peter Van Beek, et al., "Adaptive streaming of high-quality video over wireless LANs," Visual communications and Image Processing 2004, Proc. of SPIE—IS&T Electronics Imaging, SPIE vol. 5308, 2004, pp. 647-660.

Wendell Smith, "Wireless Video White Paper," ViXS Systems Inc., ViXS Confidential, Jan. 9, 2002, 15 pages.

James F. Kurose and Keith W. Ross, "Computer Networking: A Top-Down Approach Featuring the Internet," Copyright 2001 by Addison Wesley Longman, Inc.

M. Kalman, E. Steinbach, and B. Girod, "Adaptive Media Playout for Low-Delay video Streaming Over Error-Prone Channels," IEEE Transactions on Circuits and Systems for Video Technology, vol. 14, No. 6, Jun. 2004, pp. 841-851.

R. Ramjee, J. Kurose, D. Towsley, and H. Schulzrinne, "Adaptive Playout Mechanisms for Packetized Audio Applications in Wide-Area Networks," IEEE Infocom, Toronto, Canada, Jun. 1994, 9 pages.

M. Kalman, E. Steinbach, and B. Girod, "Adaptive Playout for Real-Time Media Streaming," Proc. IEEE International Symposium on Circuits and Systems, ISCAS-2002, Scottsdale, AZ, May 2002, 4 pages.

International Search Report for PCT/US 06/36433 mailed Apr. 27, 2007.

M. Kalman, B. Giron and P. Van Beek, "Optimized transcoding rate selection and packet scheduling for transmitting multiple video streams over a shared channel," IEEE Int. Conference on Image Processing (ICIP 2005), Genova, Italy, Sep. 2005, 4 pages.
K. Stuhlmuller, N. Farber, M. Link and B. Girod, "Analysis of video transmission over lossy channels," IEEE Journal on Selected Areas in Communications, vol. 18, No. 6, Jun. 2000, pp. 1012-1032.
S. Aramvith, I-M. Pao and M.-T. Sun, "A rate control scheme for video transport over wireless channels," IEEE Trans. on Circuits and Systems for Video Technology, vol. 11, No. 5, May 2001.
ISO/IEC/JTC1 SC29/WG11,"Test model 5," Apr. 1993, Sidney, Australia.
Wang & Vincent, "Bit Allocatin and Constraints for Joint Coding of Multiple Video Programs," IEEE, vol. 9, No. 6, Sep. 1999.
Xin, et. al., "Bit Allocation for Joint Transoding of Multiple MPEG Coded Video Streams," (ICME 2001), Tokyo, Japan.
Girod & Farber, "Compressed Video Over Networks," Chapter 12, Nov. 14, 1999.
Vasan & Shankar, "An Empirical Charaterization of Instantaneous Throughput in 802.11b WLANs."
Lai & Baker, "Measuring Bandwidth," Jul. 15, 1998.
Bolot & Turletti, "Experience with Control Mechanisms for Packet Video in the Internet."
Bolot & Turletti, "A Rate Control Mechanism for Packet Video in the Internet."
Paxon, "End-to-End Internet Pack Dynamics," Jun. 23, 1997.
Loguinov & Radha, "Video Receiver Based on Real-Time Estimation of Channel Capacity," IEEE ICIP 2002.
Gardner, et. al., "HomePlug Stndard Brings Networking to the Home," CSD, vol. 6, No. 12, Dec. 2000.
Chen, "Measured Performance of 5-GHx 802.11a Wireless LAN Systems," Atheros Communications, Inc., Aug. 21, 2001.
O'Hara & Petrick, "IEEE 802.11 Handbook, A designer's Companion," published May 2001.
Amy R. Reibman and Barry G. Haskell, "Constraints on Variable bit-Rate video for ATM Networks," IEEE Transactions on Circuits and Systems for Video Technology, vol. 2, No. 4, Dec. 1992, pp. 361-372.
Sergio D. Servetto and Klara Nahrstedt, "Broadcast Quality video over IP," IEEE Transactions on Multimedia, vol. 3, No. 1, Mar. 2001, pp. 162-173.
Chi-Yuan Hsu, Antonio Ortega, and Masoud Khansari, "Rate control for Robust video Transmission over burst-Error Wireless Channels," IEEE Journal on Selected Areas in communications, vol. 17, No. 5, May 1999, pp. 1-18.
Philip A. Chou and Zhourong Miao, "Rate-Distortion Optimized Streaming of Packetized Media," submitted to IEEE Transactions on Multimedia, Feb. 2001, pp. 1-20.
D. Qiao, S. Choi and K. G. Shin, "Goodput Analysis and Link Adaptation for IEEE 802.11a Wireless LANs," IEEE Trans. onMobile computing, vol. 1, No. 4, Oct.-Dec. 2002.

* cited by examiner

I = INTERFRAME
B = B-FRAME
P = P-FRAME (MPEG-2 TM5):

Dynamic rate adaptation with Virtual GOPs (VGOPs)

No or slowly varying channel conditions - super-GOP-by-GOP bit allocation (MPEG-2)

Dynamic channel conditions -
virtual-super-GOP-by-virtual-super-GOP bit allocation Dynamic channel conditions -
super-frame-by-super-frame bit allocation (no GOPs)

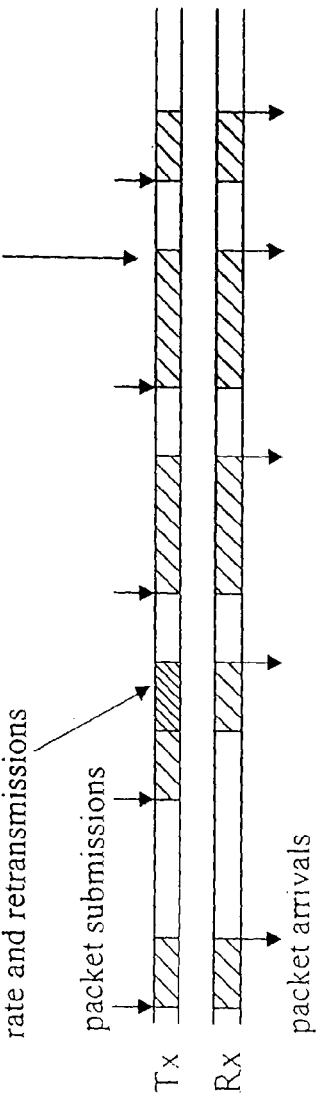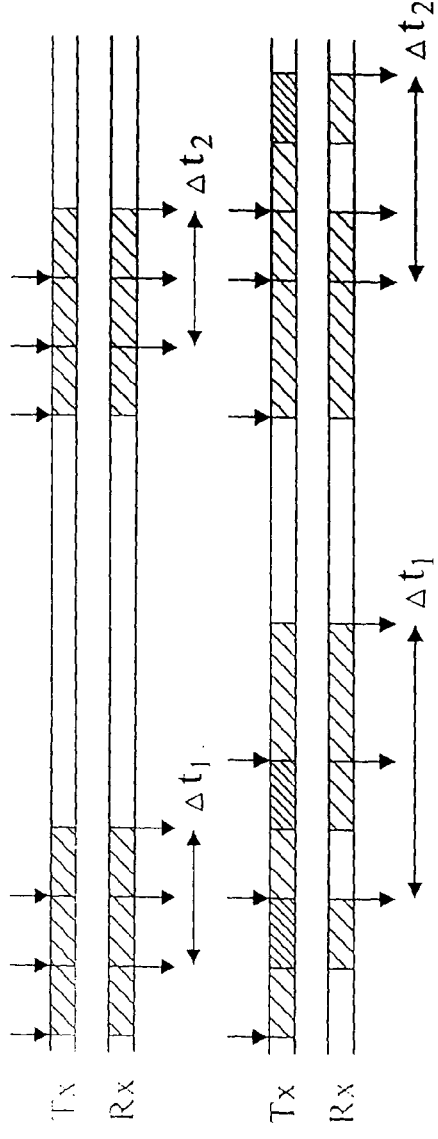
FIG. 19
FIG. 20

Measurements of maximum throughput/bandwidth using the packet burst method in ideal conditions.

- ●- Bandwidth
- ✳- 10-point average
- ✳- IIR(0.1)

Measurements of maximum throughput/bandwidth using the packet burst method in non-ideal conditions.

- ●- Bandwidth
- ✳- 10-point average
- ✳- IIR(0.1)

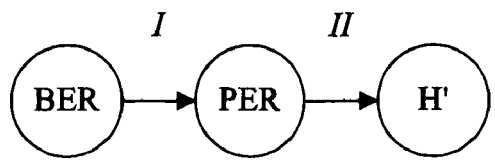
FIG. 33
| MSDU size | BER = 0 | BER = $10^{-7}$ | BER = $10^{-6}$ | BER = $10^{-5}$ | ... |
|---|---|---|---|---|---|
| 1500 | 6.246 | 6.237 | 6.159 | 5.408 | ... |
| 1400 | 6.059 | 6.051 | 5.980 | 5.294 | ... |
| 1300 | 5.856 | 5.849 | 5.785 | 5.163 | ... |
| ... | ... | ... | ... | ... | ... |
| 200 | 1.640 | 1.639 | 1.636 | 1.605 | ... |
| 100 | 0.886 | 0.886 | 0.885 | 0.876 | ... |
FIG. 34
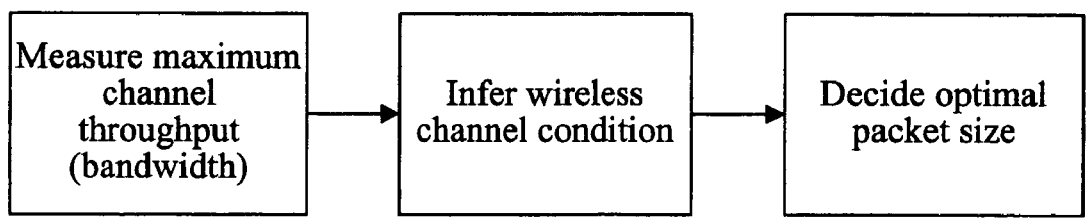
FIG. 35

Current MSDU size = 1500 bytes

| Available bandwidth range (bits per second) | New MSDU size (bytes) |
|---|---|
| [5675541, 9999999] | 1500 |
| [5007744, 5675540] | 1200 |
| [4212373, 5007743] | 1000 |
| [2977856, 4212372] | 900 |
| [1528917, 2977855] | 600 |
| [505387, 1528916] | 400 |
| [110891, 505386] | 300 |
| [15701, 110890] | 200 |
| [0, 15700] | 100 |

FIG. 36A

Current MSDU size = 1200 bytes

| Available bandwidth range (bits per second) | New MSDU size (bytes) |
|---|---|
| [5170473, 9999999] | 1500 |
| [4674327, 5170472] | 1200 |
| [4073677, 4674326] | 1000 |
| [3099940, 4073676] | 900 |
| [1800485, 3099939] | 600 |
| [692945, 1800484] | 400 |
| [171405, 692944] | 300 |
| [29788, 171404] | 200 |
| [0, 29787] | 100 |

FIG. 36B

Current MSDU size = 1000 bytes

| Available bandwidth range (bits per second) | New MSDU size (bytes) |
|---|---|
| [4734126, 9999999] | 1500 |
| [4349700, 4734125] | 1200 |
| [3879738, 4349699] | 1000 |
| [3100680, 3879737] | 900 |
| [1971702, 3100679] | 600 |
| [858762, 1971701] | 400 |
| [236682, 858761] | 300 |
| [45684, 236681] | 200 |
| [0, 45683] | 100 |

FIG. 36C

Current MSDU size = 900 bytes

| Available bandwidth range (bits per second) | New MSDU size (bytes) |
|---|---|
| [4476751, 9999999] | 1500 |
| [4147329, 4476750] | 1200 |
| [3741849, 4147328] | 1000 |
| [3063627, 3741848] | 900 |
| [2042902, 3063626] | 600 |
| [953387, 2042901] | 400 |
| [281462, 953386] | 300 |
| [57649, 281461] | 200 |
| [0, 57648] | 100 |

FIG. 36D

Current MSDU size = 600 bytes

| Available bandwidth range (bits per second) | New MSDU size (bytes) |
|---|---|
| [3494920, 9999999] | 1500 |
| [3317600, 3494919] | 1200 |
| [3096903, 3317599] | 1000 |
| [2719860, 3096902] | 900 |
| [2100193, 2719859] | 600 |
| [1248867, 2100192] | 400 |
| [493827, 1248866] | 300 |
| [124410, 493826] | 200 |
| [0, 124409] | 100 |

FIG. 36E

Current MSDU size = 400 bytes

| Available bandwidth range (bits per second) | New MSDU size (bytes) |
|---|---|
| [2594700, 9999999] | 1500 |
| [2504955, 2594699] | 1200 |
| [2391495, 2504954] | 1000 |
| [2195730, 2391494] | 900 |
| [1863720, 2195729] | 600 |
| [1336875, 1863719] | 400 |
| [697965, 1336874] | 300 |
| [232965, 697964] | 200 |
| [0, 232964] | 100 |

FIG. 36F

Current MSDU size = 300 bytes

| Available bandwidth range (bits per second) | New MSDU size (bytes) |
|---|---|
| [2040000, 9999999] | 1500 |
| [1986053, 2039999] | 1200 |
| [1918053, 1986052] | 1000 |
| [1799733, 1918052] | 900 |
| [1596187, 1799732] | 600 |
| [1258453, 1596186] | 400 |
| [777467, 1258452] | 300 |
| [323227, 777466] | 200 |
| [0, 323226] | 100 |

FIG. 36G

Current MSDU size = 200 bytes

| Available bandwidth range (bits per second) | New MSDU size (bytes) |
|---|---|
| [1393630, 9999999] | 1500 |
| [1368690, 1393629] | 1200 |
| [1336870, 1368689] | 1000 |
| [1281400, 1336869] | 900 |
| [1185080, 1281399] | 600 |
| [1020820, 1185079] | 400 |
| [755510, 1020819] | 300 |
| [415810, 755509] | 200 |
| [0, 415809] | 100 |

FIG. 36H

Current MSDU size = 100 bytes

| Available bandwidth range (bits per second) | New MSDU size (bytes) |
|---|---|
| [633960, 9999999] | 1500 |
| [628200, 633959] | 1200 |
| [621000, 628199] | 1000 |
| [608040, 620999] | 900 |
| [585000, 608039] | 600 |
| [545040, 584999] | 400 |
| [477000, 545039] | 300 |
| [365040, 476999] | 200 |
| [0, 365039] | 100 |

FIG. 36I

WIRELESS VIDEO TRANSMISSION SYSTEM

This application claims the benefit of 60/547,231 filed Feb. 23, 2004 entitled RATE ADAPTION BY VARYING PACKET SIZE FOR ROBUST VIDEO.

BACKGROUND OF THE INVENTION

The present invention relates generally to wireless transmission systems, and relates more particularly to a wireless video transmission system.

Developing an effective method for implementing enhanced television systems is a significant consideration for contemporary television designers and manufacturers. In conventional television systems, a display device may be utilized to view program information received from a program source. The conventional display device is typically positioned in a stationary location because of restrictions imposed by various physical connections that electrically couple the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

However, portable television systems typically possess certain detrimental operational characteristics that diminish their effectiveness for use in modern television systems. For example, in order to eliminate restrictive physical connections, portable televisions typically receive television signals that are propagated from a remote terrestrial television transmitter to an antenna that is integral with the portable television. Because of the size and positioning constraints associated with a portable antenna, such portable televisions typically exhibit relatively poor reception characteristics, and the subsequent display of the transmitted television signals is therefore often of inadequate quality.

Other factors and considerations are also relevant to effectively implementing an enhanced wireless television system. For example, the evolution of digital data network technology and wireless digital transmission techniques may provide additional flexibility and increased quality to portable television systems. However, current wireless data networks typically are not optimized for flexible transmission and reception of video information.

Furthermore, a significant proliferation in the number of potential program sources (both analog and digital) may benefit a system user by providing an abundance of program material for selective viewing. In particular, an economical wireless television system for flexible home use may enable television viewers to significantly improve their television-viewing experience by facilitating portability while simultaneously providing an increased number of program source selections.

However, because of the substantially increased system complexity, such an enhanced wireless television system may require additional resources for effectively managing the control and interaction of various system components and functionalities. Therefore, for all the foregoing reasons, developing an effective method for implementing enhanced television systems remains a significant consideration for designers and manufacturers of contemporary television systems.

A number of media playback systems use continuous media streams, such as video image streams, to output media content. However, some continuous media streams in their raw form often require high transmission rates, or bandwidth, for effective and/or timely transmission. In many cases, the cost and/or effort of providing the required transmission rate is prohibitive. This transmission rate problem is often solved by compression schemes that take advantage of the continuity in content to create highly packed data. Compression methods such Motion Picture Experts Group (MPEG) methods and its variants for video are well known. MPEG and similar variants use motion estimation of blocks of images between frames to perform this compression. With extremely high resolutions, such as the resolution of 1080i used in high definition television (HDTV), the data transmission rate of such a video image stream will be very high even after compression.

One problem posed by such a high data transmission rate is data storage. Recording or saving high resolution video image streams for any reasonable length of time requires considerably large amounts of storage that can be prohibitively expensive. Another problem presented by a high data transmission rate is that many output devices are incapable of handling the transmission. For example, display systems that can be used to view video image streams having a lower resolution may not be capable of displaying such a high resolution. Yet another problem is the transmission of continuous media in networks with a limited bandwidth or capacity. For example, in a local area network with multiple receiving/output devices, such a network will often have a limited bandwidth or capacity, and hence be physically and/or logistically incapable of simultaneously supporting multiple receiving/output devices.

Laksono, U.S. patent application Publication No. 2002/0140851 A1 published Oct. 3, 2002 discloses an adaptive bandwidth footprint matching for multiple compressed video streams in a limited bandwidth network.

Wang and Vincent in a paper entitled Bit Allocation and Constraints for Joint Coding of Multiple Video Programs, IEEE Transaction on Circuits and Systems for Video Technology, Vol. 9, No. 6, September 1999 discuss a multi-program transmission system in which several video programs are compressed, multiplexed, and transmitted over a single channel. The aggregate bit rate of the programs has to be equal to (or less than) the bandwidth (e.g., channel rate). This can be achieved by controlling either each individual program bit rate (independent coding) or the aggregate bit rate (joint coding). Thus in order to achieve such bit rate allocation, with a channel having 150 megabits/second of bandwidth, a first program may use 75 megabits/second, a second program may use 25 megabits/second, and a third program may use 50 megabits/second, with the channel bandwidth being distributed by measuring the bit-rate being transmitted.

BRIEF DESCRIPTION OF THE DRAWINGS

FIG. 19 illustrates an APPLICATION layer model-based approach.

FIG. 20 illustrates an APPLICATION layer packet burst approach.

FIG. 33 illustrates BER, PER, and H'.

FIG. 34 illustrates expected 802.11B MAC maximum throughput for different values of the BER and different values of the MSDU size.

FIG. 35 illustrates a processing system.

FIG. 36A-I illustrates look up tables.

BRIEF DETAILED DESCRIPTION OF THE PREFERRED EMBODIMENTS

Figure 1:
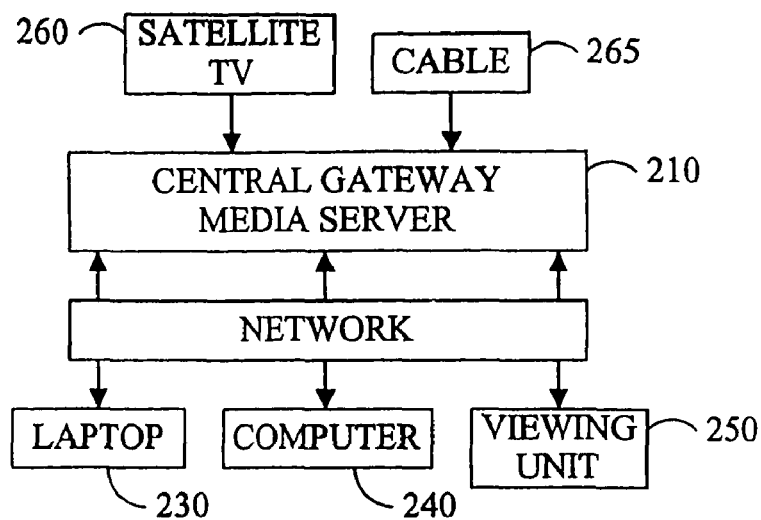
FIG. 1 illustrates a gateway, media sources, receiving units, and a network.

FIG. 1 illustrate a system for transmission of multiple data streams in a network that may have limited bandwidth. The system includes a central gateway media server 210 and a plurality of client receiver units 230, 240, 250. The central gateway media server may be any device that can transmit multiple data streams. The input data streams may be stored on the media server or arrive from an external source, such as a satellite television transmission 260, a digital video disc player, a video cassette recorder, or a cable head end 265, and are transmitted to the client receiver units 230, 240, 250 in a compressed format. The data streams can include display data, graphics data, digital data, analog data, multimedia data, audio data and the like. An adaptive bandwidth system on the gateway media server 210 determines the network bandwidth characteristics and adjusts the bandwidth for the output data streams in accordance with the bandwidth characteristics.

In one existing system, the start time of each unit of media for each stream is matched against the estimated transmission time for that unit. When any one actual transmission time exceeds its estimated transmission time by a predetermined threshold, the network is deemed to be close to saturation, or already saturated, and the system may select at least one stream as a target for lowering total bandwidth usage. Once the target stream associated with a client receiver unit is chosen, the target stream is modified to transmit less data, which may result in a lower data transmission rate. For example, a decrease in the data to be transmitted can be accomplished by a gradual escalation of the degree of data compression performed on the target stream, thereby reducing the resolution of the target stream. If escalation of the degree of data compression alone does not adequately reduce the data to be transmitted to prevent bandwidth saturation, the resolution of the target stream can also be reduced. For example, if the target stream is a video stream, the frame size could be scaled down, reducing the amount of data per frame, and thereby reducing the data transmission rate.

By way of background the bandwidth requirements for acceptable quality of different types of content vary significantly:

CD audio is generally transmitted at about 1 Mbps;

Standard definition video (MPEG-2) is generally transmitted at about 6 Mbps;

High Definition video (MPEG-2) is generally transmitted at about 20 Mbps; and

Multiple audio/video streams are generally transmitted at about 50-150 Mbps or more.

The overall quality can be expressed in many different ways, such as for example, the peak signal-to-noise ratio, delay (<100 ms for effective real-time two-way communication), synchronization between audio and video (<10 ms typically), and jitter (time varying delay). In many cases the audio/video streams are unidirectional, but may include a back-channel for communication.

There are many characteristics that the present inventors identified that may be considered for an audio/visual transmission system in order to achieve improved results over the technique described above.

(1) The devices may be located at different physical locations, and, over time, the users may change the location of these devices relative to the gateway. For example, the user may relocate the device near the gateway or farther away from the gateway, or, the physical environment may change significantly over time, both of which affect the performance of the wireless network for that device, and in turn the available bandwidth for other devices. This results in unpredictable and dynamically varying bandwidth.

(2) Different devices interconnected to the network have different resources and different usage paradigms. For example, different devices may have different microprocessors, different memory requirements, different display characteristics, different connection bandwidth capabilities, and different battery resources. In addition, different usage paradigms may include for example, a mobile handheld device versus a television versus a personal video recorder. This results in unpredictable and dynamically varying network maximum throughput.

(3) Multiple users may desire to access the data from the system simultaneously using different types of devices. As the user access data and stops accessing data the network conditions will tend to dynamically change. This results in unpredictable and dynamically varying network maximum throughput.

(4) Depending on the client device the transmitted data may need to be in different formats, such as for example, MPEG-2, MPEG-1, H.263, H.261, H.264, MPEG-4, analog, and digital. These different formats may have different impacts on the bandwidth. This results in unpredictable and dynamically varying network maximum throughput.

(5) The data provided to the gateway may be in the form of compressed bit streams which may include a constant bit rate (CBR) or variable bit rate (VBR). This results in unpredictable and dynamically varying network maximum throughput.

Various network technologies may be used for the gateway reception and transmission, such as for example, IEEE 802.11, Ethernet, and power-line networks (e.g., HomePlug Powerline Alliance). While such networks are suitable for data transmission, they do not tend to be especially suitable for audio/video content because of the stringent requirements imposed by the nature of audio/video data transmission. Moreover, the network capabilities, and in particular the data maximum throughput offered, are inherently unpredictable and may dynamically change due to varying conditions described above. The data throughput may be defined in terms of the amount of actual (application) payload bits (per second) being transmitted from the sender to the receiver successfully. It is noted that while the system may refer to audio/video, the concepts are likewise used for video alone and/or audio alone.

With reference to one particular type of wireless network, namely, IEEE 802.11, such as IEEE 802.11a and 802.11b, they can operate at several different data link rates:

6, 9, 12, 18, 24, 36, 48, or 54 Mbps for 802.11(a), and
1, 2, 5.5, or 11 Mbps for 802.11(b).

However, the actual maximum throughput as seen by the application layer is lower due to protocol overhead and depends on the distance between the client device and the access point (AP), and the orientation of the client device. Accordingly, the potential maximum throughput for a device within a cell (e.g., a generally circular area centered around the AP) is highest when the device is placed close to the AP and lower when it is farther away. In addition to the distance, other factors contribute to lowering the actual data maximum throughput, such as the presence of walls and other building structures, and radio-frequency interference due to the use of cordless phones and microwave ovens. Furthermore, multiple devices within the same cell communicating with the same AP must share the available cell maximum throughput.

A case study by Chen and Gilbert, "Measured Performance of 5-GHz 802.11a wireless LAN systems", Atheros Communications, 27 Aug. 2001 shows that the actual maximum throughput of an IEE 802.11a system in an office environment is only about 23 Mbps at 24 feet, and falls below 20 Mbps (approximately the rate of a single high definition video signal) at ranges over 70 feet. The maximum throughput of an 802.11(b) system is barely 6 Mbps and falls below 6 Mbps (approximately the rate of a single standard definition video signal at DVD quality) at ranges over 25 feet. The report quotes average throughput values for within a circular cell with radius of 65 feet (typical for large size houses in the US) as 22.6 Mbps and 5.1 Mbps for 802.11a and 802.11b, respectively. Accordingly, it may be observed that it is not feasible to stream a standard definition and a high definition video signal to two client devices at the same time using an 802.11a system, unless the video rates are significantly reduced. Also other situations likewise involve competing traffic from several different audiovisual signals. Moreover, wireless communications suffer from radio frequency interference from devices that are unaware of the network, such as cordless phones and microwave ovens, as previously described. Such interference leads to unpredictable and dynamic variations in network performance, i.e., losses in data maximum throughput/bandwidth.

Wireless Local Area Networks (WLANs), such as 802.11 systems, include efficient error detection and correction techniques at the Physical (PHY) and Medium Access Control (MAC) layer. This includes the transmission of acknowledgment frames (packets) and retransmission of frames that are believed to be lost. Such retransmission of frames by the source effectively reduces the inherent error rate of the medium, at the cost of lowering the effective maximum throughput. Also, high error rates may cause the sending stations in the network to switch to lower raw data link rates, again reducing the error rate while decreasing the data rates available to applications.

Networks based on power-line communication address similar challenges due to the unpredictable and harsh nature of the underlying channel medium. Systems based on the HomePlug standard include technology for adapting the data link rate to the channel conditions. Similar to 802.11 wireless networks, HomePlug technology contains techniques such as error detection, error correction, and retransmission of frames to reduce the channel error rate, while lowering effective maximum throughput. Due to the dynamic nature of these conditions, the maximum throughput offered by the network may (e.g., temporarily) drop below the data rate required for transmission of AV data streams. This results in loss of AV data, which leads to an unacceptable decrease in the perceived AV quality.

To reduce such limitations one may (1) improve network technology to make networks more suitable to audio/visual data and/or (2) one may modify the audio/visual data to make the audio/visual data more suitable to such transmission networks. Therefore, a system may robustly stream audio/visual data over (wireless) networks by:

(1) optimizing the quality of the AV data continuously, in real-time; and
(2) adapting to the unpredictable and dynamically changing conditions of the network.

Accordingly a system that includes dynamic rate adaption is suitable to accommodate distribution of high quality audio/video streams over networks that suffer from significant dynamic variations in performance. These variations may be caused by varying of distance of the receiving device from the transmitter, from interference, or other factors.

The following discussion includes single-stream dynamic rate adaptation, followed by multi-stream dynamic rate adaptation, and then various other embodiments.

Single Stream Dynamic Rate Adaptation

Figure 2:
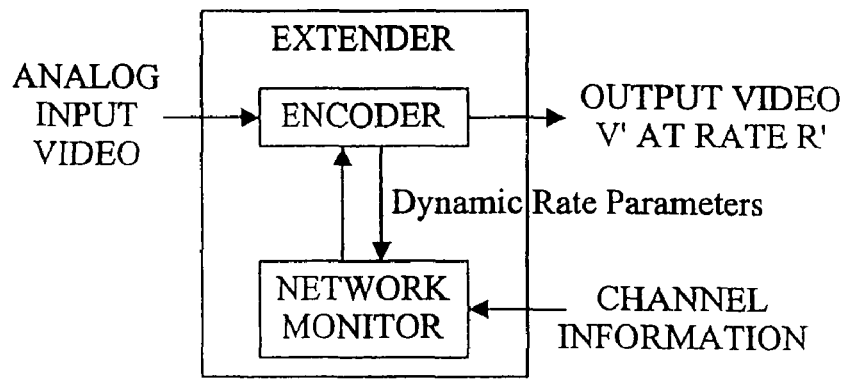
FIG. 2 illustrates an analog extender.
Figure 3:
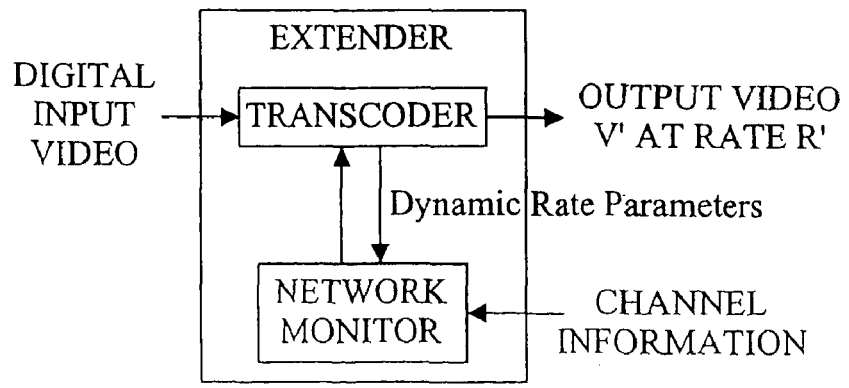
FIG. 3 illustrate a digital extender.

A system that uses dynamic rate adaptation for robust streaming of video over networks may be referred to as an extender. A basic form of an extender that processes a single video stream is shown in FIGS. 2 and 3. FIGS. 2 and 3 depict the transmitting portion of the system, the first having analog video inputs, the second having digital (compressed) video inputs. The extender includes a video encoding or transcoding module, depending on whether the input video is in analog or digital (compressed) format. If the input is analog, the processing steps may include A/D conversion, as well as digital compression, such as by an MPEG-2 encoder, and eventual transmission over the network. If the input is already in digital format, such as an MPEG-2 bit stream, the processing may include transcoding of the incoming bit stream to compress the incoming video into an output stream at a different bit rate, as opposed to a regular encoder. A transcoding module normally reduces the bit rate of a digitally compressed input video stream, such as an MPEG-2 bit stream or any other suitable format.

The coding/transcoding module is provided with a desired output bit rate (or other similar information) and uses a rate control mechanism to achieve this bit rate. The value of the desired output bit rate is part of information about the transmission channel provided to the extender by a network monitor module. The network monitor monitors the network and estimates the bandwidth available to the video stream in real time. The information from the network monitor is used to ensure that the video stream sent from the extender to a receiver has a bit rate that is matched in some fashion to the available bandwidth (e.g., channel rate). With a fixed video bit rate normally the quality varies on a frame by frame basis. To achieve the optimal output bit rate, the coder/transcoder may increase the level of compression applied to the video data, thereby decreasing visual quality slowly. In the case of a transcoder, this may be referred to as transrating. Note that the resulting decrease in visual quality by modifying the bit stream is minimal in comparison to the loss in visual quality that would be incurred if a video stream is transmitted at bit rates that can not be supported by the network. The loss of video data incurred by a bit rate that can not be supported by the network may lead to severe errors in video frames, such as dropped frames, followed by error propagation (due to the nature of video coding algorithms such as MPEG). The feedback obtained from the network monitor ensures that the output bit rate is toward an optimum level so that any loss in quality incurred by transrating is minimal.

The receiver portion of the system may include a regular video decoder module, such as an MPEG-2 decoder. This decoder may be integrated with the network interface (e.g., built into the hardware of a network interface card). Alternatively, the receiving device may rely on a software decoder (e.g., if it is a PC). The receiver portion of the system may also include a counterpart to the network monitoring module at the transmitter. In that case, the network monitoring modules at the transmitter and receiver cooperate to provide the desired estimate of the network resources to the extender system. In some cases the network monitor may be only at the receiver.

If the system, including for example the extender, has information about the resources available to the client device consuming the video signal as previously described, the extender may further increase or decrease the output video quality in accordance with the device resources by adjusting bandwidth usage accordingly. For example, consider an MPEG-1 source stream at 4 Mbps with 640 by 480 spatial resolution at 30 fps. If it is being transmitted to a resource-limited device, e.g., a handheld with playback capability of 320 by 240 picture resolution at 15 fps, the transcoder may reduce the rate to 0.5 Mbps by simply subsampling the video without increasing the quantization levels. Otherwise, without subsampling, the transcoder may have to increase the level of quantization. In addition, the information about the device resources also helps prevent wasting shared network resources. A transcoder may also convert the compression format of an incoming digital video stream, e.g., from MPEG-2 format to MPEG-4 format. Therefore, a transcoder may for example: change bit rate, change frame rate, change spatial resolution, and change the compression format.

The extender may also process the video using various error control techniques, e.g. such methods as forward error correction and interleaving.

Dynamic Rate Adaptation

Another technique that may be used to manage available bandwidth is dynamic rate adaptation, which generally uses feedback to control the bit rate. The rate of the output video is modified to be smaller than the currently available network bandwidth from the sender to the receiver, most preferably smaller at all times. In this manner the system can adapt to a network that does not have a constant bit rate, which is especially suitable for wireless networks.

Figure 4:
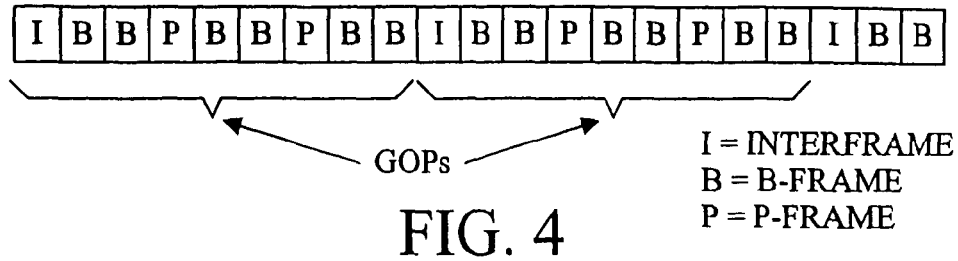
FIG. 4 illustrates GOPs.
Figure 10:
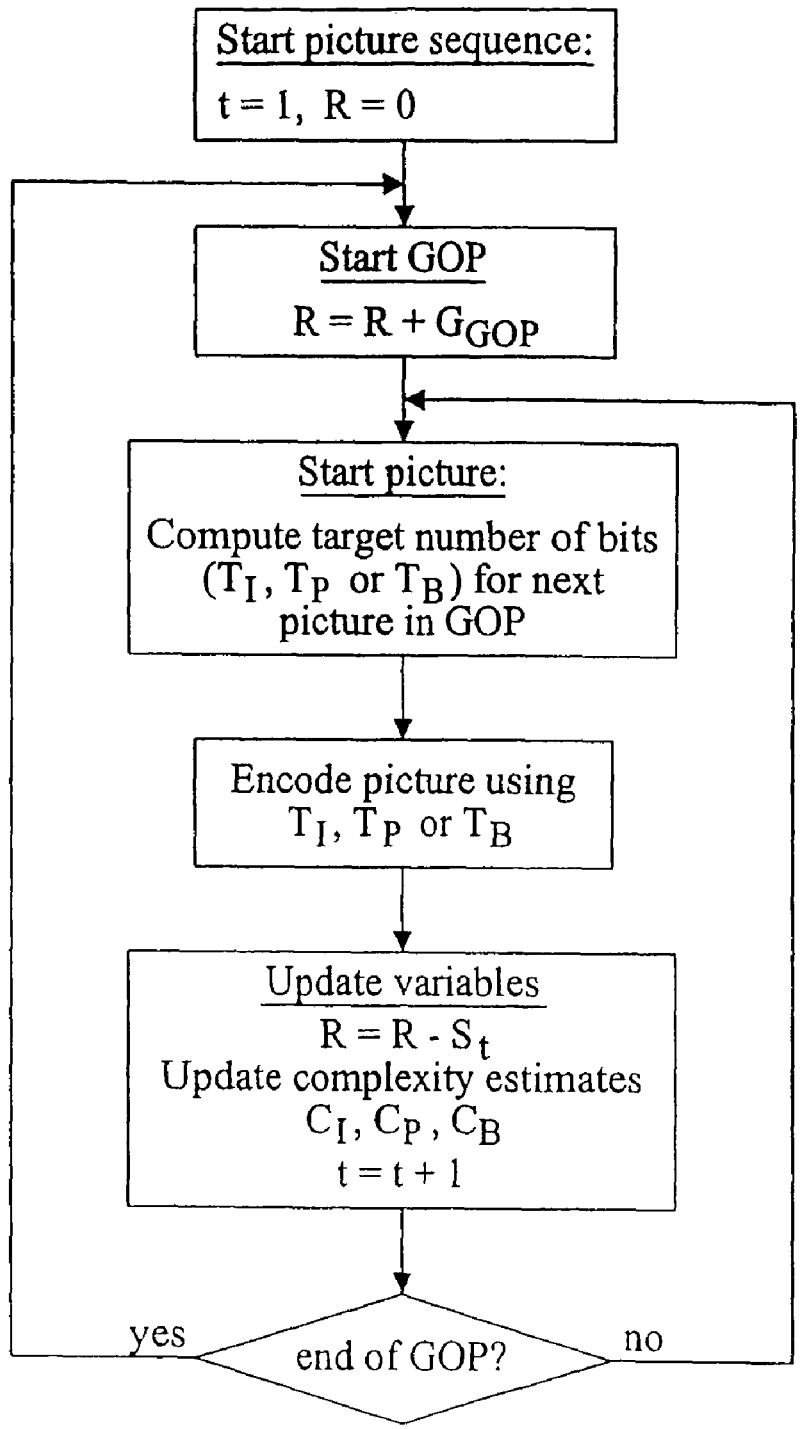
FIG. 10 illustrates MPEG-2 TM5.

One technique for rate control of MPEG video streams is that of the so-called MPEG-2 Test Model 5 (TM5), which is a reference MPEG-2 codec algorithm published by the MPEG group (see FIG. 10). Referring to FIG. 4, rate control in TM5 starts at the level of a Group-of-Pictures (GOP), consisting of a number of I, P, and B-type video frames. The length of a GOP in number of pictures is denoted by $N_{GOP}$. Rate control for a constant-bit-rate (CBR) channel starts by allocating a fixed number of bits $G_{GOP}$ to a GOP that is in direct proportion to the (constant) bandwidth offered. Subsequently, a target number of bits is allocated to a specific frame in the GOP. Each subsequent frame in a GOP is allocated bits just before it is coded. After coding all frames in a GOP, the next GOP is allocated bits. This is illustrated in FIG. 4 where $N_{GOP}$=9 for illustration purposes.

An extension for a time-varying channel can be applied if one can assume that the available bandwidth varies only slowly relative to the duration of a GOP. This may be the case when the actual channel conditions for some reason change only slowly or relatively infrequently. Alternatively, one may only be able to measure the changing channel conditions with coarse time granularity. In either case, the bandwidth can be modeled as a piece-wise constant signal, where changes are allowed only on the boundaries of a (super) GOP. Thus, $G_{GOP}$ is allowed to vary on a GOP-by-GOP basis.

Figure 5:
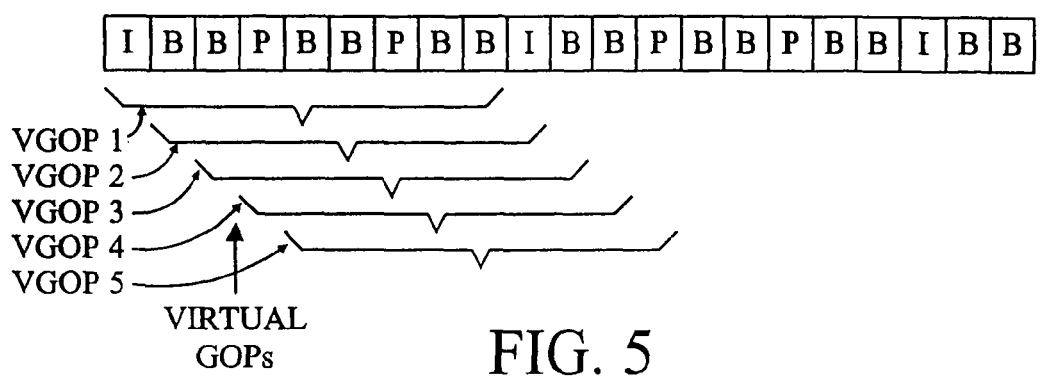
FIG. 5 illustrates virtual GOPs.
Figure 11:
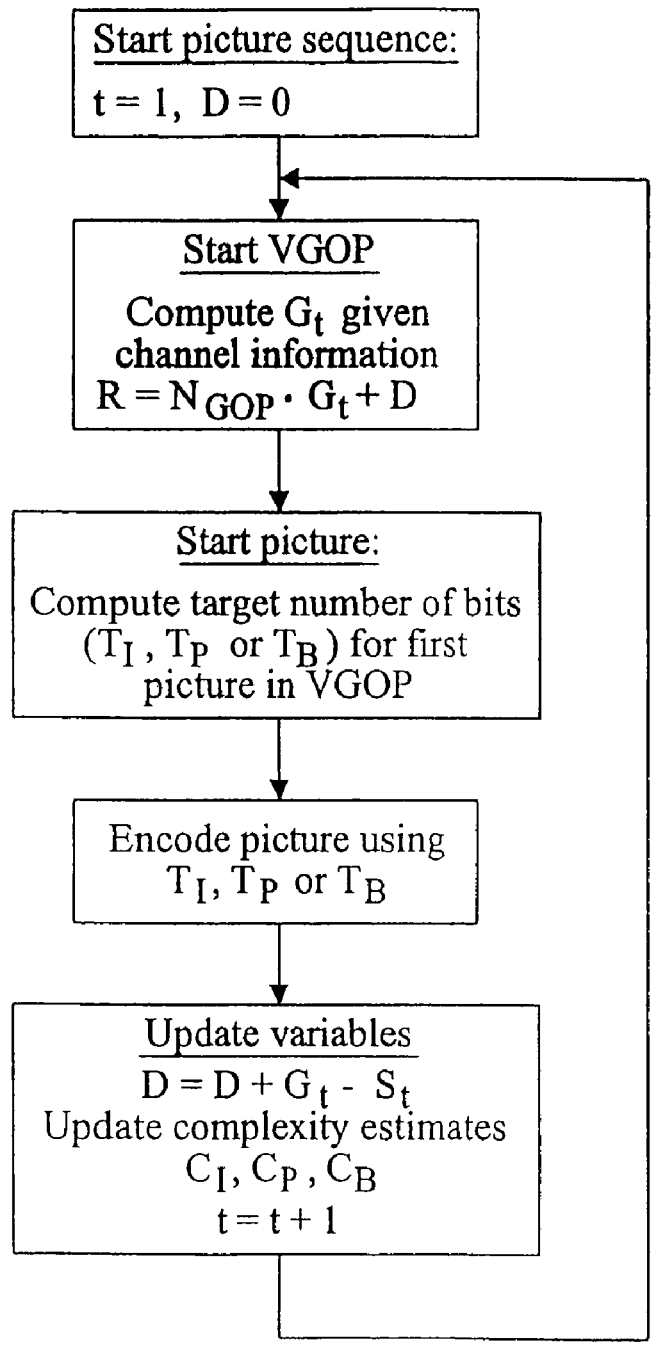
FIG. 11 illustrates dynamic rate adaptation with virtual GOPs.

However, this does not resolve the issues when the bandwidth varies quickly relative to the duration of a GOP, i.e., the case where adjustments to the target bit rate and bit allocation should be made on a frame-by-frame basis or otherwise a much more frequent basis. To allow adjustments to the target bit rate on a frame-by-frame basis, one may introduce the concept of a virtual GOP, as shown in FIG. 5 (see FIG. 11).

Each virtual GOP may be the same length as an actual MPEG GOP, any other length, or may have a length that is an integer multiple of the length of an actual MPEG GOP. A virtual GOP typically contains the same number of I-, P- and B-type pictures within a single picture sequence. However, virtual GOPs may overlap each other, where the next virtual GOP is shifted by one (or more) frame with respect to the current virtual GOP. The order of I-, P- and B-type pictures changes from one virtual GOP to the next, but this does not influence the overall bit allocation to each virtual GOP. Therefore, a similar method, as used e.g. in TM5, can be used to allocate bits to a virtual GOP (instead of a regular GOP), but the GOP-level bit allocation is in a sense "re-started" at every frame (or otherwise "re-started" at different intervals).

Let $R_t$ denote the remaining number of bits available to code the remaining frames of a GOP, at frame t. Let $S_t$ denote the number of bits actually spent to code the frame at time t. Let $N_t$ denote the number of frames left to code in the current GOP, starting from frame t.

In TM5, $R_t$ is set to 0 at the start of the sequence, and is incremented by $G_{GOP}$ at the start of every GOP. Also, $S_t$ is subtracted from $R_t$ at the end of coding a picture. It can be shown that $R_t$ can be written as follows, in closed form:

$$R_t = N_t G_P + \sum_{j=1}^{t-1} (G_P - S_j), \quad (1)$$

where $G_P$ is a constant given by:

$$G_P = \frac{G_{GOP}}{N_{GOP}}$$

indicating the average number of bits available to code a single frame.

To handle a time varying bandwidth, the constant $G_P$ may be replaced by $G_t$, which may vary with t. Also, the system may re-compute (1) at every frame t, i.e., for each virtual GOP. Since the remaining number of frames in a virtual GOP is $N_{GOP}$, the system may replace $N_t$ by $N_{GOP}$, resulting in:

$$R_t = N_{GOP} G_t + \sum_{j=1}^{t-1} (G_j - S_j), \quad (2)$$

Given $R_t$, the next step is allocate bits to the current frame at time t, which may be of type I, P, or B. This step takes into account the complexity of coding a particular frame, denoted by $C_t$. Frames that are more complex to code, e.g., due to complex object motion in the scene, require more bits to code, to achieve a certain quality. In TM-5, the encoder maintains estimates of the complexity of each type of frame (I, P, or B), which are updated after coding each frame. Let $C_I$, $C_P$ and $C_B$ denote the current estimates of the complexity for I, P and B frames. Let $N_I$, $N_P$ and $N_B$ denote the number of frames of type I, P and B left to encode in a virtual GOP (note that these are constants in the case of virtual GOPs).

TM5 prescribes a method for computing $T_I$, $T_P$ and $T_B$, which are the target number of bits for an I, B, or P picture to be encoded, based on the above parameters. The TM5 equations may be slightly modified to handle virtual GOPs as follows:

$$T_I = R_t \bigg/ \left( N_I + N_P \frac{K_I C_P}{K_P C_I} + N_B \frac{K_I C_B}{K_B C_I} \right) \quad (3)$$

$$T_P = R_t \bigg/ \left( N_P + N_I \frac{K_P C_I}{K_I C_P} + N_B \frac{K_P C_B}{K_B C_P} \right),$$

$$T_B = R_t \bigg/ \left( N_B + N_I \frac{K_B C_I}{K_I C_B} + N_P \frac{K_B C_P}{K_P C_B} \right)$$

where $K_I$, $K_P$, and $K_B$ are constants. I, B, P, refer to I frames, B frames, and P frames, and C is a complexity measure. It is to be understood that any type of compression rate distortion model, defined in the general sense, may likewise be used.

As it may be observed, this scheme permits the reallocation of bits on a virtual GOP basis from frame to frame (or other basis consistent with virtual GOP spacing). The usage and bit allocation for one virtual GOP may be tracked and the unused bit allocation for a virtual GOP may be allocated for the next virtual GOP.

Multi-Stream Dynamic Rate Adaptation

The basic extender for a single AV stream described above will encode an analog input stream or adapt the bit rate of an input digital bit stream to the available bandwidth without being concerned about the cause of the bandwidth limitations, or about other, competing streams, if any. In the following, the system may include a different extender system that processes multiple video streams, where the extender system assumes the responsibility of controlling or adjusting the bit rate of multiple streams in the case of competing traffic.

Figure 6:
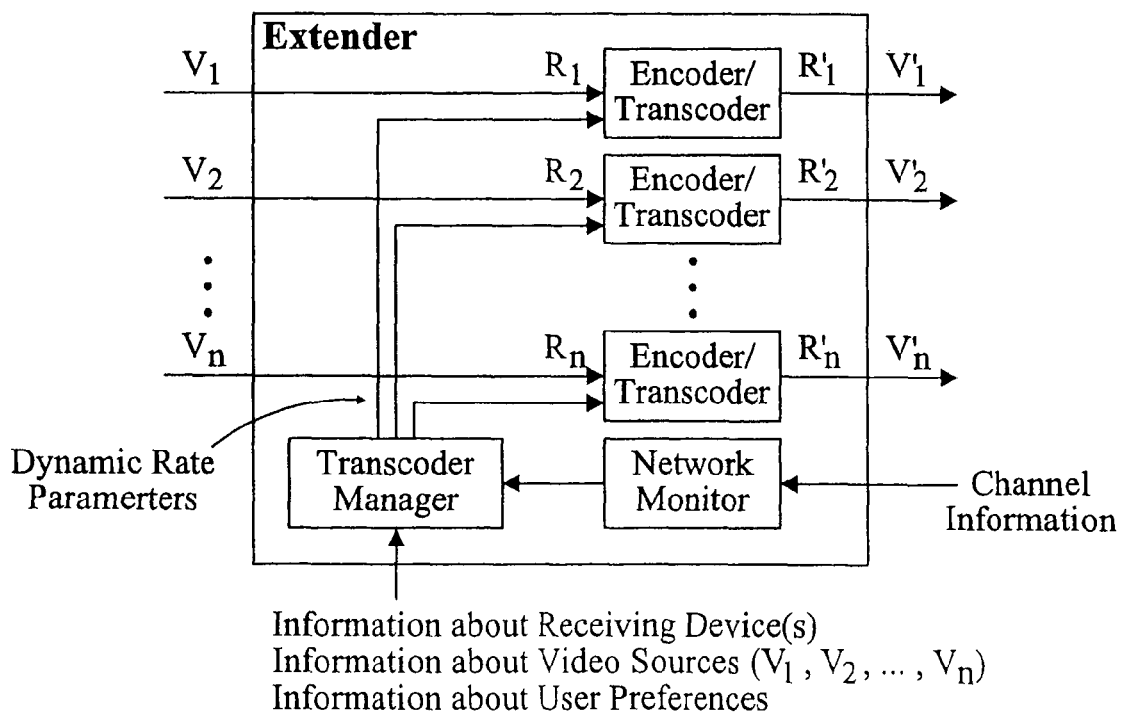
FIG. 6 illustrates a more detailed view of an extender.

The multi-stream extender, depicted in FIG. 6, employs a "(trans)coder manager" on top of multiple video encoders/transcoders. As shown in FIG. 6, the system operates on n video streams, where each source may be either analog (e.g. composite) or digital (e.g. MPEG-2 compressed bitstreams). Here, $V_n$ denotes input stream n, while $V'_n$ denotes output stream n. $R_n$ denotes the bit rate of input stream n (this exists only if input stream n is in already compressed digital form; it is not used if the input is analog), while $R'_n$ denotes the bit rate of output stream n.

Each input stream is encoded or transcoded separately, although their bit rates are controlled by the (trans)coder manager. The (trans)coder manager handles competing requests for bandwidth dynamically. The (trans)coding manager allocates bit rates to multiple video streams in such a way that the aggregate of the bit rates of the output video streams matches the desired aggregate channel bit rate. The desired aggregate bit rate, again, is obtained from a network monitor module, ensuring that the aggregate rate of multiple video streams does not exceed available bandwidth. Each coder/transcoder again uses some form of rate control to achieve the allocated bit rate for its stream.

In this case, the system may include multiple receivers (not shown in the diagram). Each receiver in this system has similar functionality as the receiver for the single-stream case.

As in the single-stream case, the bit rate of the multiple streams should be controlled by some form of bit allocation and rate control in order to satisfy such constraints. However, in the case of a multi-stream system, a more general and flexible framework is useful for dynamic bit rate adaptation. There are several reasons for this, as follows:

(1) The system should deal with multiple AV streams that may have different characteristics, and should allocate the available bits as supported by the channel accordingly;

(2) The system should deal with the network characteristics, which are partly unpredictable, and need special attention in the case of multiple receivers as described later;

(3) The system should handle any differences between the receiving devices themselves, such as differences in screen sizes, supported frame rates, etc.; and (4) The different video sources may be regarded as different in importance due to their content. Also, since the different video streams are viewed by different people (users), possibly in different locations (e.g., different rooms in a home), the system may want to take the preferences of the different users into account.

The resulting heterogeneity of the environment may be taken into account during optimization of the system.

To this end, the multi-stream extender system may optionally receive further information as input to the transcoder manager (in addition to information about the transmission channel), as shown in FIG. 6. This includes, for example:
Information about each receiving device;
Information about each video source; and
Information about the preferences of each user.

In the following subsections, first is listed the type of constraints that the bit rate of the multiple streams in this system are subject to. Then, the notion of stream prioritizing is described, which is used to incorporate certain heterogeneous characteristics of the network as discussed above. Then, various techniques are described to achieve multi-stream (or joint) dynamic rate adaptation.

Bit Rate Constraints for Multiple Streams

The bit rates of individual audio/video streams on the network are subject to various constraints.

Firstly, the aggregate rates of individual streams may be smaller than or equal to the overall channel capacity or network bandwidth from sender to receiver. This bandwidth may vary dynamically, due to increases or decreases in the number of streams, due to congestion in the network, due to interference, etc.

Further, the rate of each individual stream may be bound by both a minimum and a maximum. A maximum constraint may be imposed due to the following reasons.

(1) A stream may have a maximum rate due to limitations of the channel or network used. For instance, if a wireless network is used, the maximum throughput to a single device depends on the distance between the access point and the client device. Note that this maximum may be time-varying. For instance, if the client device in a wireless network is portable and its distance to the access point is increasing (e.g. while being carried), the maximum throughput is expected to decrease.

(2) A stream may have a maximum rate due to limitations of the client device. The client device may have limited capabilities or resources, e.g., a limited buffer size or limited processing power, resulting in an upper bound on the rate of an incoming audio/video stream.

(3) A stream may have a minimum rate imposed by the system or by the user(s), in order to guarantee a minimum quality. If this minimum rate cannot be provided by the system, transmission to the device may not be performed. This helps achieve some minimum quality. A stream may also have a minimum rate imposed in order to prevent buffer underflow.

Stream Prioritizing or Weighting

The (trans)coder manager discussed above may employ several strategies. It may attempt to allocate an equal amount of available bits to each stream; however, in this case the quality of streams may vary strongly from one stream to the other, as well as in time. It may also attempt to allocate the available bits such that the quality of each stream is approximately equal; in this case, streams with highly active content will be allocated more bits than streams with less active content. Another approach is to allow users to assign different priorities to different streams, such that the quality of different streams is allowed to vary, based on the preferences of the user(s). This approach is generally equivalent to weighting the individual distortion of each stream when the (trans)coder manager minimizes the overall distortion.

The priority or weight of an audio/video stream may be obtained in a variety of manners, but is generally related to the preferences of the users of the client devices. Note that the weights (priorities) discussed here are different from the type of weights or coefficients seen often in literature that correspond to the encoding complexity of a macro block, video frame, group of frames, or video sequence (related to the amount of motion or texture variations in the video), which may be used to achieve a uniform quality among such parts of the video. Here, weights will purposely result in a non-uniform quality distribution across several audio/video streams, where one (or more) such audio/video stream is considered more important than others. Various cases, for example, may include the following, and combinations of the following.

Case A

Figure 15:
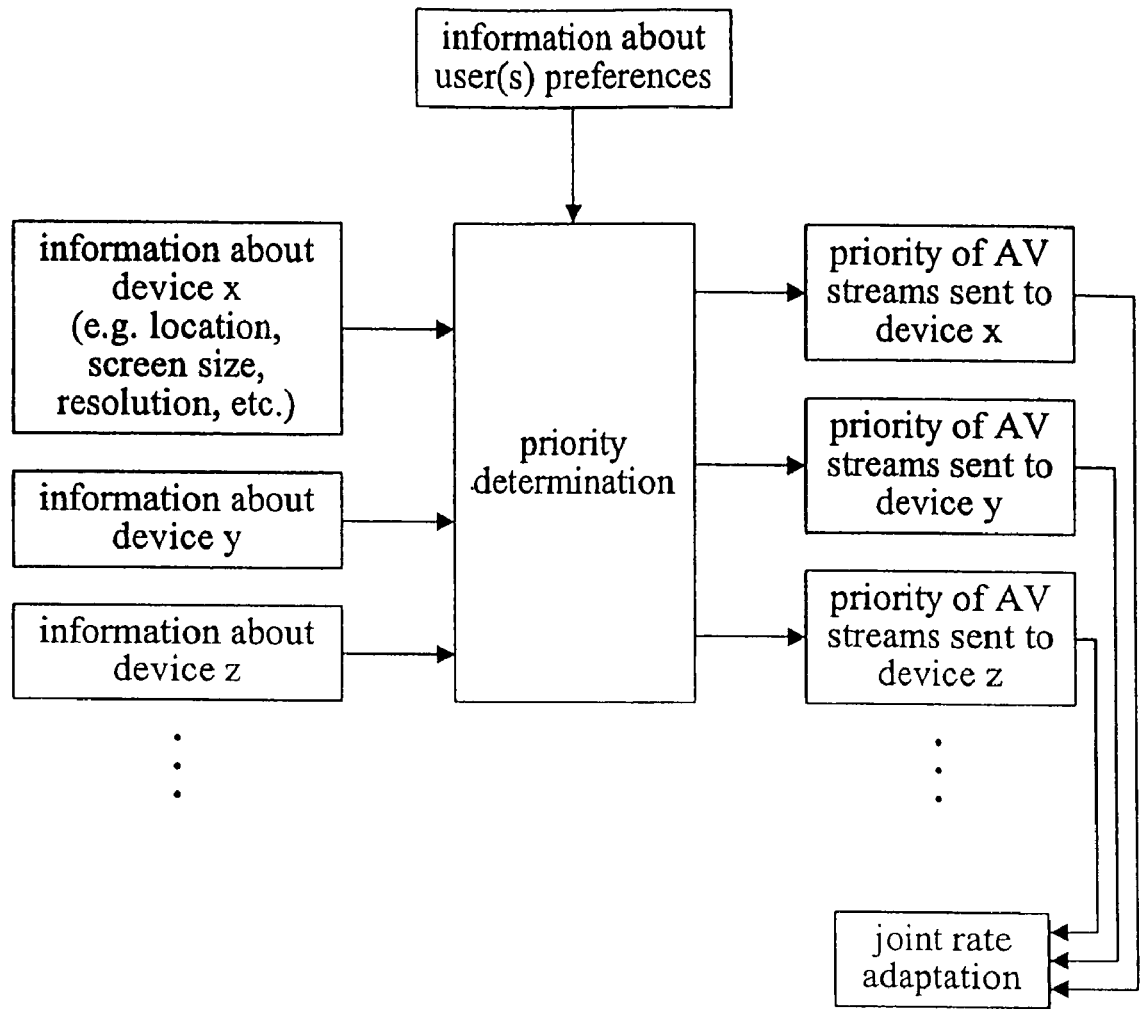
FIG. 15 illustrates user preferences and priority determination for streams.

The weight of a stream may be the result of a preference that is related to the client device (see FIG. 15). That is, in the case of conflicting streams requesting bandwidth from the channel, one device is assigned a priority such that the distortion of streams received by this device are deemed more severe as an equal amount of distortion in a stream received by another device. For instance, the user(s) may decide to assign priority to one TV receiver over another due to their locations. The user(s) may assign a higher weight to the TV in the living room (since it is likely to be used by multiple viewers) compared to a TV in the bedroom or den. In that case, the content received on the TV in the living room will suffer from less distortion due to transcoding than the content received on other TVs. As another instance, priorities may be assigned to different TV receivers due to their relative screen sizes, i.e., a larger reduction in rate (and higher distortion) may be acceptable if a TV set's screen size is sufficiently small. Other device resources may also be translated into weights or priorities.

Such weighting could by default be set to fixed values, or using a fixed pattern. Such weighting may require no input from the user, if desired.

Such weighting may be set once (during set up and installation). For instance, this setting could be entered by the user, once he/she decides which client devices are part of the network and where they are located. This set up procedure could be repeated periodically, when the user(s) connect new client devices to the network.

Such weighting may also be the result of interaction between the gateway and client device. For instance, the client device may announce and describe itself to the gateway as a certain type of device. This may result in the assignment by the gateway of a certain weighting or priority value to this device.

Case B

Figure 16:
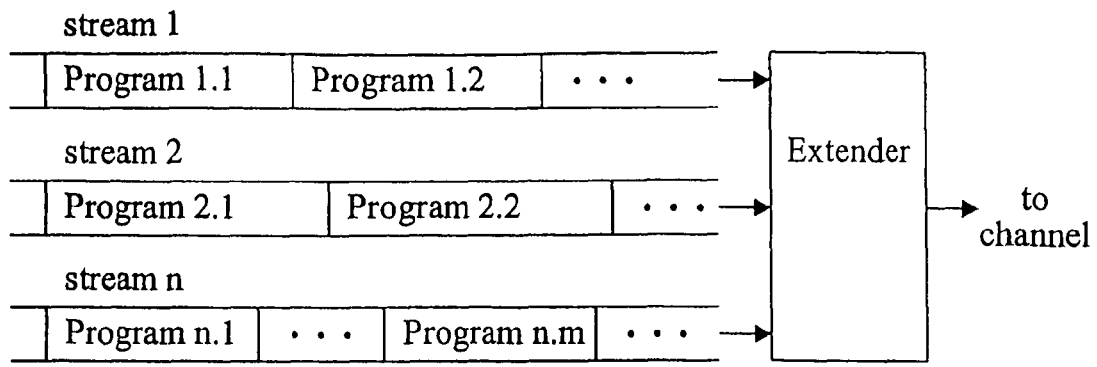
FIG. 16 illustrates the weight of a stream resulting from preferences at a particular point in time.
Figure 16:
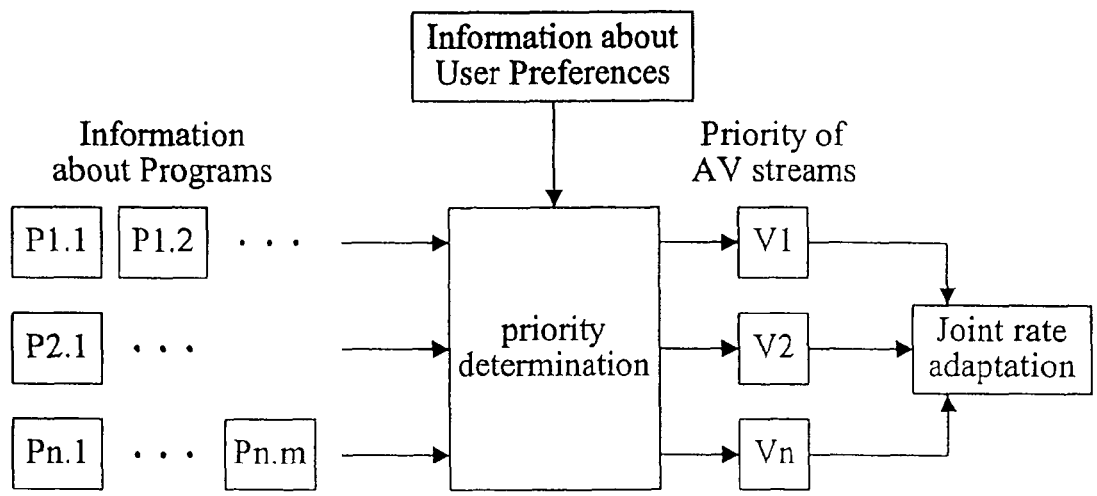

The weight of a stream may be result of a preference that is related to a content item (such as TV program) that is carried by a particular stream at a particular point in time (see FIG. 16). That is, for the duration that a certain type of content is transmitted over a stream, this stream is assigned a priority such that the distortion of this stream is deemed more severe as an equal amount of distortion in other streams with a different type of content, received by the same or other devices. For instance, the user(s) may decide to assign priority TV programs on the basis of its genre, or other content-related attributes. These attributes, e.g. genre information, about a program can be obtained from an electronic program guide. These content attributes may also be based on knowledge of the channel of the content (e.g. Movie Channel, Sports Channel, etc). The user(s) may for example assign a higher weight to movies, compared to other TV programs such as gameshows. In this case, when multiple streams contend for limited channel bandwidth, and one stream carries a movie to one TV receiver, while another stream simultaneously carries a gameshow to another TV, the first stream is assigned a priority such that it will be distorted less by transcoding than the second stream.

Such weighting could by default be set to fixed values, or using a fixed pattern. Such weighting may require no input from the user, if desired.

Such weighting may be set once (during set up and installation). For instance, this setting could be entered by the user, once he/she decides which type(s) of content are important to him/her. Then, during operation, the gateway may match the description of user preferences (one or more user preferences) to descriptions of the programs transmitted. The actual weight could be set as a result of this matching procedure. The procedure to set up user preferences could be repeated periodically. The user preference may be any type of preference, such as those of MPEG-7 or TV Anytime. The system may likewise include the user's presence (any user or a particular user) to select, at least in part, the target bit rate. The user may include direct input, such as a remote control. Also, the system may include priorities among the user preferences to select the target bit rate.

Such weighting may also be the result of the gateway tracking the actions of the user. For instance, the gateway may be able to track the type of content that the user(s) consume frequently. The gateway may be able to infer user preferences from the actions of the user(s). This may result in the assignment by the gateway of a certain weighting or priority value to certain types of content.

Case C

Figure 17:
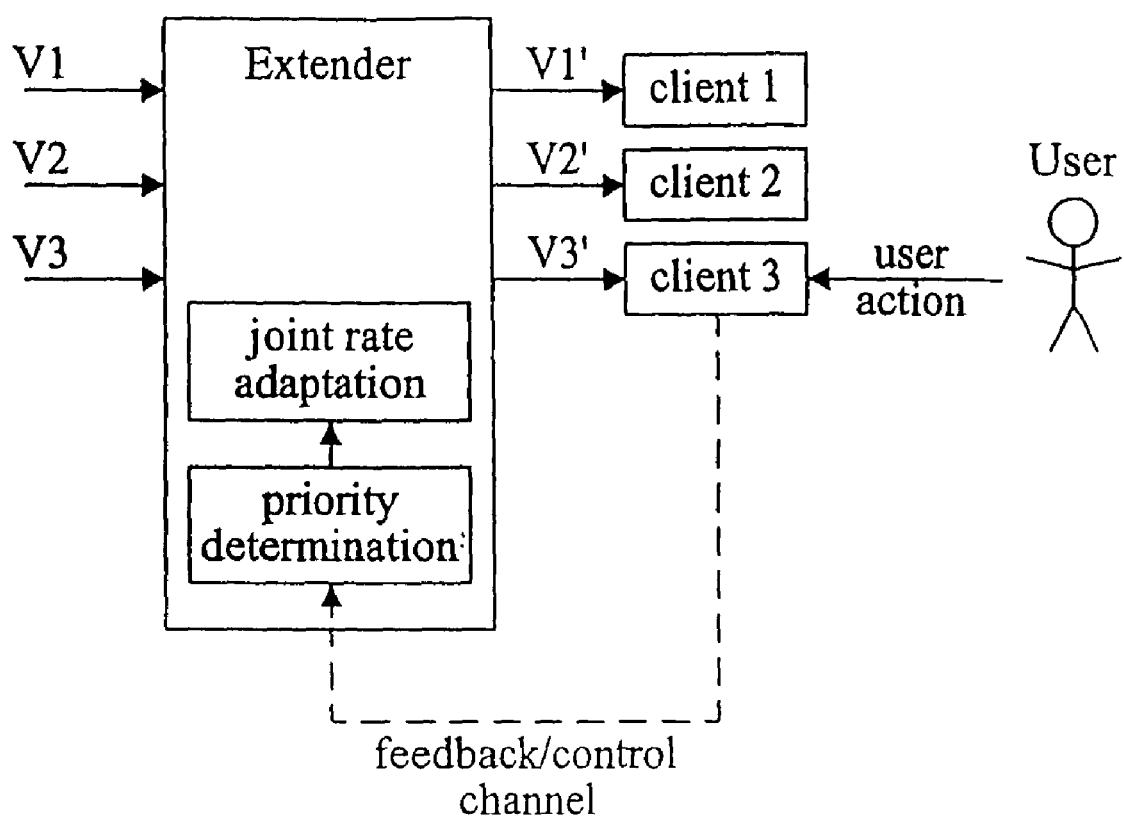
FIG. 17 illustrates the relative weight of streams set or changed at arbitrary times or on user demand.

The relative weight of streams may also be set or changed at arbitrary times or on user demand (see FIG. 17).

Such weighting may be bound to a particular person in the household. For instance, one person in a household may wish to receive the highest possible quality content, no matter what device he/she uses. In this case, the weighting can be changed according to which device that person is using at any particular moment.

Such weighting could be set or influenced at an arbitrary time, for instance, using a remote control device.

Such weighting could also be based on whether a user is recording content, as opposed to viewing. Weighting could be such that a stream is considered higher priority (hence should suffer less distortion) if that stream is being recorded (instead of viewed).

Case D

The relative weight of streams may also be set based on their modality. In particular, the audio and video streams of an audiovisual stream may be separated and treated differently during their transmission. For example, the audio part of an audiovisual stream may be assigned a higher priority than the video part. This case is motivated by the fact that when viewing a TV program, in many cases, loss of audio information is deemed more severe by users than loss of video information from the TV signal. This may be the case, for instance, when the viewer is watching a sports program, where a commentator provides crucial information. As another example, it may be that users do not wish to degrade the quality of audio streams containing hi-quality music. Also, the audio quality could vary among different speakers or be sent to different speakers.

Network Characteristics

The physical and data link layers of the aforementioned networks are designed to mitigate the adverse conditions of the channel medium. One of the characteristics of these networks specifically affects bit allocation among multiple streams as in a multi-stream extender system discussed here. In particular, in a network based on IEEE 802.11, a gateway system may be communicating at different data link rates with different client devices. WLANs based on IEEE 802.11 can operate at several data link rates, and may switch or select data link rates adaptively to reduce the effects of interference or distance between the access point and the client device. Greater distances and higher interference cause the stations in the network to switch to lower raw data link rates. This may be referred to as multi-rate support. The fact that the gateway may be communicating with different client devices at different data rates, in a single wireless channel, affects the model of the channel as used in bit allocation for joint coding of multiple streams.

Prior work in rate control and bit allocation uses a conventional channel model, where there is a single bandwidth that can simply be divided among AV streams in direct proportion to the requested rates for individual AV streams. The present inventors determined that this is not the case in LANs such as 802.11 WLANs due to their multi-rate capability. Such wireless system may be characterized in that the sum of the rate of each link is not necessarily the same as the total bandwidth available from the system, for allocation among the different links. In this manner, a 10 Mbps video signal, and a 20 Mbps video signal may not be capable of being transmitted by a system having a maximum bandwidth of 30 Mbps. The bandwidth used by a particular wireless link in an 802.11 wireless system is temporal in nature and is related to the maximum bandwidth of that particular wireless link. For example, if link 1 has a capacity of 36 Mbps and the data is transmitted at a rate of 18 Mbps the usage of that link is 50%. This results in using 50% of the systems overall bandwidth. For example, if link 2 has a capacity of 24 Mbps and the data is transmitted at a rate of 24 Mbps the usage of link 2 is 100%. Using link 2 results in using 100% of the system's overall bandwidth leaving no bandwidth for other links, thus only one stream can be transmitted.

Bit Allocation in Joint Coding of Multiple Streams

A more optimal approach to rate adaptation of multiple streams is to apply joint bit allocation/rate control. This approach applies to the case where the input streams to the multi-stream extender system are analog, as well as the case where the input streams are already in compressed digital form.

Let the following parameters be defined:

$N_L$ denote the number of streams $p_n$ denote a weight or priority assigned to stream n, with $p_n \geq 0$ $a_n$ denote a minimum output rate for stream n, with $a_n \geq 0$ $b_n$ denote a maximum output rate for stream n, with $b_n \geq a_n$ $D_n(r)$ denote the distortion of output stream n as a function of its output rate r (i.e. the distortion of the output with respect to the input of the encoder or transcoder)

$R_C$ denote the available bandwidth of the channel or maximum network maximum throughput $R_n$ denotes the bit rate of input stream n $R'_n$ denotes the bit rate of output stream n Note that $R_n$, $R'_n$ and $R_C$ may be time-varying in general; hence, these are functions of time t.

The problem of the multi-stream extender can be formulated generically as follows:

The goal is to find the set of output rates $R'_n$, n=1, ..., $N_L$, that maximizes the overall quality of all output streams or, equivalently, minimizes an overall distortion criterion D, while the aggregate rate of all streams is within the capacity of the channel.

One form of the overall distortion criterion D is a weighted average of the distortion of the individual streams:

$$D = \sum_{n=1}^{N_L} p_n D_n(R'_n) \quad (4)$$

Another form is the maximum of the weighted distortion of individual streams:

$$D = \max_n \{p_n D_n(R'_n)\} \quad (5)$$

In this section, a conventional channel model is used, similar to cable tv, where an equal amount of bit rate offered to a stream corresponds to an equal amount of utilization of the channel, while it may be extended to the wireless type utilizations described above. Therefore, the goal is to minimize a criterion such as (4) or (5), subject to the following constraints:

$$\sum_{n=1}^{N_L} R'_n \leq R_C \quad (6)$$

and, for all n, $$0 \leq a_n \leq R'_n \leq b_n \leq R_n \quad (7)$$

at any given time t.

In the case of transcoding, note that the distortion of each output stream $V'_n$ is measured with respect to the input stream $V_n$, which may already have significant distortion with respect to the original data due to the original compression. However, this distortion with respect to the original data is unknown. Therefore, the final distortion of the output stream with respect to the original (not input) stream is also unknown, but bounded below by the distortion already present in the corresponding input stream $V_n$. It is noted that in the case of transcoding, a trivial solution to this problem is found when the combined input rates do not exceed the available channel bandwidth, i.e, when:

$$\sum_{n=1}^{N_L} R_n \leq R_C \quad (8)$$

In this case, $R'_n = R_n$ and $D_n(R'_n) = D_n(R_n)$ for all n, and no transcoding needs to be applied.

It is noted that no solution to the problem exists, when:

$$R_C \leq \sum_{n=1}^{N_L} a_n \quad (9)$$

This may happen when the available channel bandwidth/network maximum throughput would drop (dramatically) due to congestion, interference, or other problems. In this situation, one of the constraints (7) would have to be relaxed, or the system would have to deny access to a stream requesting bandwidth.

It is noted that an optimal solution that minimizes the distortion criterion as in (5) is one where the (weighted) distortion values of individual streams are all equal.

It is noted that (6) embodies a constraint imposed by the channel under a conventional channel model. This constraint is determined by the characteristics of the specific network. A different type of constraint will be used as applied to LANs with multi-rate support.

A few existing optimization algorithms exist that can be used to find a solution to the above minimization problem, such as Lagrangian optimization and dynamic programming. Application of such optimization algorithms to the above problem may require search over a large solution space, as well as multiple iterations of compressing the video data. This may be prohibitively computationally expensive. A practical approach to the problem of bit allocation for joint coding of multiple video programs extends the approach used in the so-called MPEG-2 Test Model 5 (TM5).

An existing approach is based on the notions of super GOP and super frame. A normal MPEG-2 GOP (Group-of-Pictures) of a single stream contains a number of I, P and B-type frames. A super GOP is formed over multiple MPEG-2 streams and consists of $N_{GOP}$ super frames, where a super frame is a set of frames containing one frame from each stream and all frames in a super frame coincide in time. A super GOP always contains an integer number of stream-level MPEG-2 GOPs, even when the GOPs of individual streams are not the same length and not aligned. The bit allocation method includes a target number of bits assigned to a super GOP. This target number $T_s$ is the same for every super GOP and is derived from the channel bit rate, which is assumed fixed. Given $T_s$, the bit allocation is done for each super frame within a super GOP. The resulting target number of bits for a super frame $T_f$ depends on the number of I, P, and B frames in the given streams. Then, given $T_f$, the bit allocation is done for each frame within a super frame. The resulting target number of bits for a frame within a super frame at time t is denoted by $T_{t,n}$.

The existing technique is based on the use of a complexity measure C for a video frame, that represents the "complexity" of encoding that frame. Subsequently, streams are allocated bits proportional to the estimated complexity of the frames in each stream. That is, streams with frames that are more "complex" to code, receive more bits during bit allocation compared to streams that are less "complex" to code, resulting in an equal amount of distortion in each stream.

The complexity measure C for a video frame is defined as the product of the quantization value used to compress the DCT coefficients of that video frame, and the resulting number of bits generated to code that video frame (using that quantization value). Therefore, the target number of bits $T_{t,n}$ for a particular frame within a super frame can be computed on the basis of an estimate of the complexity of that frame, $C_{t,n}$, and the quantizer used for that frame, $Q_{t,n}$:

$$T_{t,n} = \frac{C_{t,n}}{Q_{t,n}} \quad (10)$$

The value of $C_{t,n}$ is assumed constant within a stream for all future frames of the same type (I, P or B) to be encoded. Therefore, $C_{t,n}$ equals either $C_{I,n}$, or $C_{P,n}$, or $C_{B,n}$ depending on the frame type.

The sum of the number of bits allocated to all frames within a superframe should be equal to the number of bits allocated to that superframe, i.e., $$T_t = \sum_{n=1}^{N_L} T_{t,n} \qquad (11)$$

The technique uses an equal quantizer value Q for all frames in all streams, in order to achieve uniform picture quality. However, taking into account the different picture types (I, P and B), the quantizer values for each frame are related to the fixed Q by a constant weighting factor:

$$Q_{t,n} = K_{t,n} Q \qquad (12)$$

where $K_{t,n}$ is simply either $K_I$, $K_P$ or $K_B$, depending only on the frame type.

Combining (10), (11) and (12), results in the following bit allocation equation for frames within a super frame:

$$T_{t,n} = \frac{\frac{1}{K_{t,n}} C_{t,n}}{\sum_{n=1}^{N_L} \frac{1}{K_{t,n}} C_{t,n}} T_t \qquad (13)$$

This equation expresses that frames from different streams are allocated bits proportional to their estimated complexities.

To accommodate prioritization of streams as discussed above, the existing techniques may be extended as follows:

One may generalize (12) by including stream priorities $p_n$ as follows:

$$Q_{t,n} = \frac{K_{t,n} Q}{p_n} \qquad (14)$$

where $p_n$ are chosen such that:

$$\sum_{n=1}^{N_L} \frac{1}{p_n} = N_L \qquad (15)$$

For example, if all streams have the same priority, $p_n = 1$ for all n, such that (15) holds. Higher priority streams are assigned values $p_n$ greater than 1, while lower priority streams are assigned values of $p_n$ smaller than 1.

Combining (10), (11) and (14), one obtains:

$$T_{t,n} = \frac{\frac{p_n}{K_{t,n}} C_{t,n}}{\sum_{n=1}^{N_L} \frac{p_n}{K_{t,n}} C_{t,n}} T_t \qquad (16)$$

which can be used for bit allocation instead of (13). From (16), it can be seen that the priorities can be used to allocate more bits to frames from high priority streams and less bits to frames from low priority streams. This strategy implicitly attempts to minimize the distortion criterion (5). Note that this extension applies to both encoding and transcoding.

In the approach described above, intended for encoding, encoding complexities C of frames are estimated from past encoded frames. These estimates are updated every frame and used to allocate bits to upcoming frames. That is, the estimate of complexity for the current frame t and future frames is based on the measurement of the values of the quantizer used in a previous frame as well as the actual amount of bits spent in that previous frame (in the same stream n). Therefore, the estimate is:

$$C'_{t,n} = S'_{t-\tau,n} Q'_{t-\tau,n} \qquad (17)$$

where S indicates the number of bits actually spent on a video frame, t indicates the current frame and t-τ indicates the nearest previous frame of the same type (I, P or B), and the prime indicates that the estimate is computed from the output of the encoder. Note again that in reality only 3 different values for these estimates are kept for a single stream, one for each picture type.

While this approach can also be used in transcoding, the present inventor determined that it is possible to improve these estimates. The reason is that in the case of transcoding, one has information about the complexity of the current frame, because one has this frame available in encoded form at the input of the transcoder. However, it has been observed that complexity of the output frame is not the same as the complexity of the input frame of the transcoder because the transcoder changes the rate of the bitstream. It has been observed that the ratio of the output complexity over the input complexity remains relatively constant over time. Therefore, an estimate of this ratio based on both input and output complexity estimates of a previous frame can be used to scale the given input complexity value of the current frame, to arrive at a better estimate of the output complexity of the current frame:

$$C'_{t,n} = \frac{S'_{t-\tau,n} Q'_{t-\tau,n}}{S_{t-\tau,n} Q_{t-\tau,n}} S_{t,n} Q_{t,n} \qquad (18)$$

where S and Q without prime are computed from the input bitstream.

The approach described above for multi-stream encoding all assumed a constant target bit rate, i.e., a constant bit rate channel. This assumption actually does not hold in certain networks, especially for wireless channels, as previously described. Accordingly, a modified approach that takes into account the time varying nature of the channel is useful.

An extension can be applied if one can assume that the target bit rate varies only slowly relative to the duration of a (super) GOP. This may be the case when the actual channel conditions for some reason change only slowly or relatively infrequently. Alternatively, one may only be able to measure the changing channel conditions with coarse time granularity. In either case, the target bit rate can not be made to vary more quickly than a certain value dictated by the physical limitations. Therefore, the target bit rate can be modeled as a piecewise constant signal, where changes are allowed only on the boundaries of a (super) GOP.

This approach can be combined with the aforementioned approach by providing a new value of $T_s$ to the bit allocation algorithm (possibly with other extensions as discussed above) at the start of every (super) GOP. In other words, $T_s$ is allowed to vary on a (super) GOP-by-GOP basis.

Another extension is to use the concept of virtual GOPs for the case where the target bit rates varies quickly relative to the duration of a (super) GOP, i.e., the case where adjustments to the target bit rate and bit allocation must be made on a (super) frame-by-frame basis. The use of virtual GOPs was explained for the single-stream dynamic rate adaptation above. In the multi-stream case, the concept of virtual GOPs extends to the concept of virtual super GOPs.

Another bit allocation approach in joint coding of multiple streams in a LAN environment, such as those based on IEEE 802.11, is suitable for those networks that have multi-rate support. In this case an access point in the gateway may be communicating at different data link rates with different client devices. For this, and other reasons, the maximum data throughput from the gateway to one device may be different from the maximum throughput from the gateway to another device, while transmission to each device contributes to the overall utilization of a single, shared, channel.

As before, there are $N_L$ devices on a network sharing available channel capacity. It may be assumed there are $N_L$ streams being transmitted to these $N_L$ devices (1 stream per device). The system employs a multi-stream manager (i.e., multi-stream transcoder or encoder manager) that is responsible for ensuring the best possibly quality of video transmitted to these devices.

It may be assumed that a mechanism is available to measure the bandwidth or maximum data throughput $H_n$ to each device n=1, 2, ..., $N_L$. In general, this throughput varies per device and varies with time due to variations in the network: $H_n(t)$. It can be assumed that the data maximum throughput can be measured at a sufficiently fine granularity in time. The maximum data throughput $H_n$ is measured in bits per second. Note that the maximum throughput $H_n$ is actually an average over a certain time interval, e.g., over the duration of a video frame or group of frames.

In the case of 802.11 networks, for instance, the bandwidth or maximum data throughput for device n may be estimated from knowledge about the raw data rate used for communication between the access point and device n, the packet length (in bits), and measurements of the packet error rate. Other methods to measure the maximum throughput may also be used.

One particular model of the (shared) channel is such that the gateway communicates with each client device n for a fraction $f_n$ of the time. For example, during a fraction $f_1$ of the time, the home gateway is transmitting video stream 1 to device 1, and during a fraction $f_2$ of the time, the gateway is transmitting video stream 2 to device 2, and so on. Therefore, an effective throughput is obtained from the gateway to client n that is equal to:

$f_n H_n$.

The following channel constraint holds over any time interval:

$$\sum_{n=1}^{N_L} f_n \leq 1.0 \quad (19)$$

i.e., the sum of channel utilization fractions must be smaller than (or equal to) 1.0. If these fractions add up to 1.0, the channel is utilized to its full capacity.

In the case of transcoding, let $R_n$ denote the rate of the original (source) video stream n. To be able to transmit video streams to all devices concurrently, there may exist a set of $f_n$, n=1, 2, ..., $N_L$, such that the following holds for all n, under the constraint of (19):

$f_n H_n \geq R_n \quad (20)$

If such a set of $f_n$ does not exist, then the rate of one or more video sources be reduced. Let $R'_n$ denote the rate of the transrated (output) video stream n. To retain the highest possible video quality, the minimum amount of rate reduction should be applied, in order for a set of $f_n$ to exist, such that the following holds for all n, under the constraint of (19):

$f_n H_n = R'_n \quad (21)$

In the case of joint encoding (instead of joint transcoding), the goal is simply to find a solution to (21), under the constraint of (19), where $R'_n$ denotes the rate of the encoder output stream n.

In general, the problem of determining a set of fractions $f_n$ is an under-constrained problem. The above relationships do not provide a unique solution. Naturally, the goal is to find a solution to this problem that maximizes some measure of the overall quality of all video streams combined.

An embodiment is based on a joint coding principle, where the bit rates of different streams are allowed to vary based on their relative coding complexity, in order to achieve a generally uniform picture quality. This approach maximizes the minimum quality of any video stream that are jointly coded, i.e., this approach attempts to minimize distortion criterion (5).

One may consider $N_L$ video streams, where each stream is MPEG-2 encoded with GOPs of equal size $N_G$. One may also consider a set of $N_L$ GOPS, one from each stream, concurrent in time. This set, also called super GOP, contains $N_L \times N_G$ video frames. The first step in some bit allocation techniques is to assign a target number of bits to each GOP in a super GOP, where each GOP belongs to a different stream n. The allocation is performed in proportion to the relative complexity of each GOP in a super GOP. The second step in the bit allocation procedure is to assign a target number of bits to each frame of the GOP of each video stream.

Let $T_n$ denote the target number of bits assigned to the GOP of stream n (within a super GOP). Let $S_{n,t}$ denote the number of bits generated by the encoder/transcoder for frame t of video stream n. The total number of bits generated for stream n over the course of a GOP should be equal (or close) to $T_n$, i.e., $$T_n = \sum_{t=1}^{N_G} S_{n,t} \quad (22)$$

As in the MPEG-2 TM5 a coding complexity measure for a frame is used that is the product of the quantizer value used and the number of bits generated for that frame, i.e., $C_{n,t} = Q_{n,t} S_{n,t} \quad (23)$ Therefore, (22) can be rewritten as:

$$T_n = \sum_{t=1}^{N_G} \frac{C_{n,t}}{Q_{n,t}} \quad (24)$$

As in equation (14) a generally constant quality approach may be used. All quantizer values may be equal, up to a constant factor $K_{n,t}$ that accounts for the differences in picture types (I, P, and B) and a stream priority $p_n$. Therefore, (24) can be rewritten as:

$$T_n = \frac{p_n}{Q} \sum_{t=1}^{N_G} \frac{C_{n,t}}{K_{n,t}} \quad (25)$$

To achieve (21), the following may hold:

$$T_n = f_n H_n \frac{N_G}{\text{frame\_rate}} \quad (26)$$

Combining equations (25) and (26), together with (19), provides the following solution for the set of n unknowns, $f_n$ (factoring out Q).

$$f_n = \frac{\frac{p_n}{H_n} \sum_{t=1}^{N_G} \frac{C_{n,t}}{K_{n,t}}}{\sum_{n=1}^{N_L} \frac{p_n}{H_n} \sum_{t=1}^{N_G} \frac{C_{n,t}}{K_{n,t}}} \quad (27)$$

It is assumed that the channel is utilized to its maximum capacity, i.e., the sum of channel utilization fractions adds up to exactly 1.0. Note that the approach is still valid if the utilization fractions need to add up to a lower value than 1.0. Equation (27) would simply be modified with an additional factor to allow for this. For instance, there may be non-AV streams active in the network that consume some of the channel capacity. In the case of non-AV streams, some capacity has to be set aside for such streams, and the optimization of the rates of AV streams should take this into account, by lowering the mentioned sum lower than 1.0.

Given $f_n$, the actual target rate for each GOP can be computed with (26).

Figure 12:
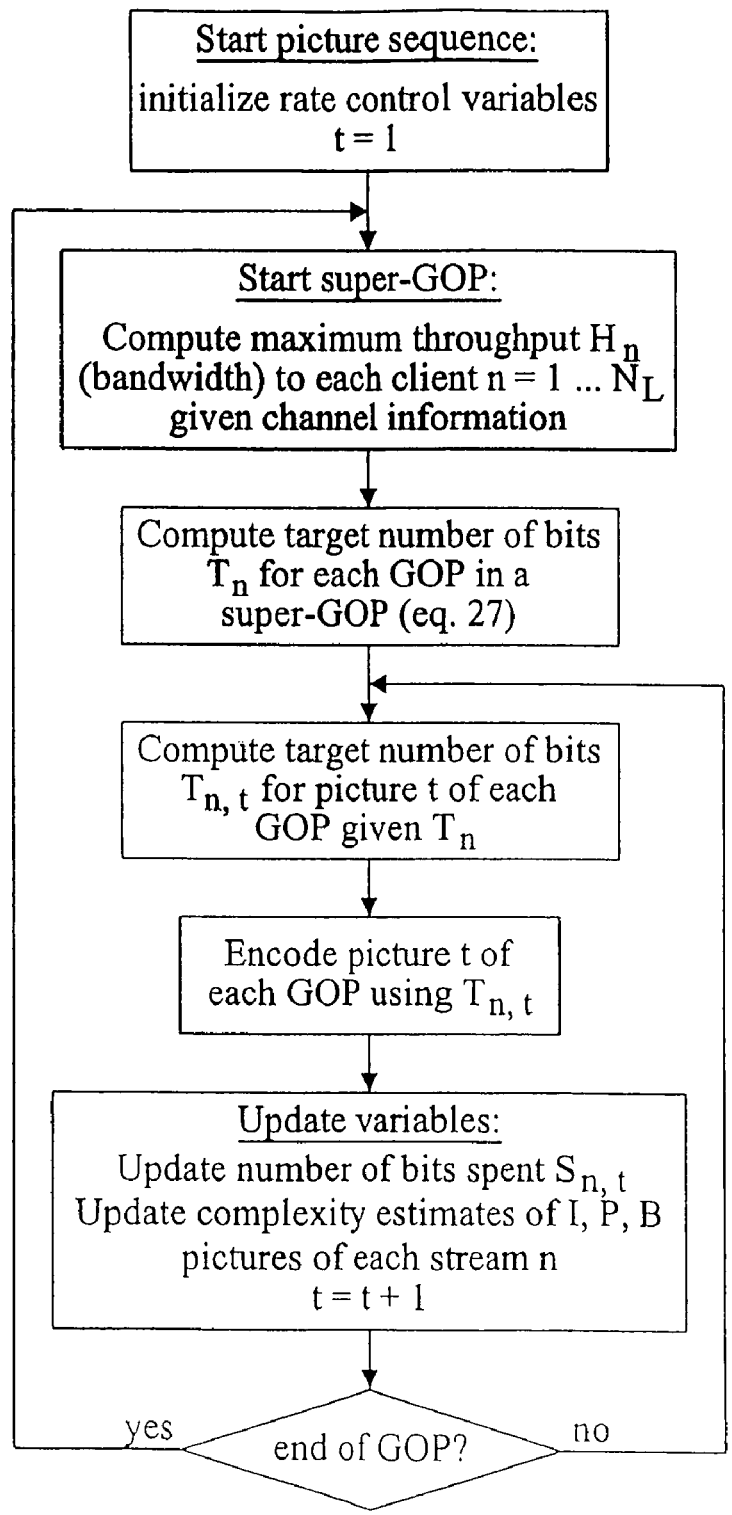
FIG. 12 illustrates slowly varying channel conditions of super GOPS by GOP bit allocation.

As mentioned above, the second step in the bit allocation procedure is to assign a target number of bits to each frame of the GOP of each video stream. This can be achieved using existing bit allocation methods, such as the one provided in TM5. Subsequent coding or transcoding can be performed with any standard method, in this case any encoder/transcoder compliant to MPEG-2 (see FIG. 12).

Although the above method has been derived specifically for the wireless LAN case, it should be noted that the above model and equations hold for any other type of LAN or network where a central gateway, server, or access point may communicate with multiple client devices at different maximum rates.

Figure 13:
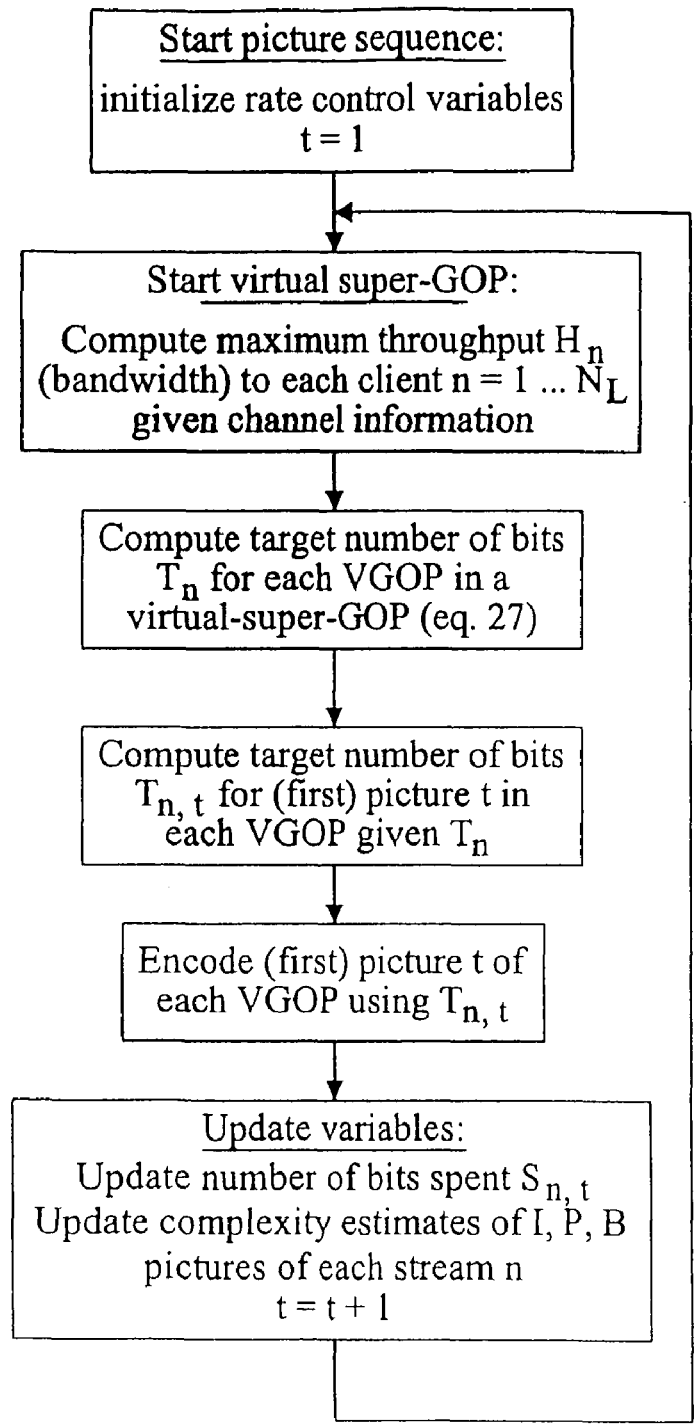
FIG. 13 illustrates dynamic channel conditions of virtual super GOP by virtual super GOP bit allocation.

In the case of dynamic rate adaptation, the maximum throughput rates $H_n$ vary in time. In this case, the above method can be combined with the notion of virtual GOPs, or virtual super GOPs, which consist of virtual GOPs of multiple AV streams, and overlap in time (see FIG. 13). Equation (27) would be executed at every frame time, to assign a target number of bits to a virtual GOP of a particular stream n. Subsequently, a target number of bits for each frame within each virtual GOP must be assigned, using, for instance, equations (3).

Figure 14:
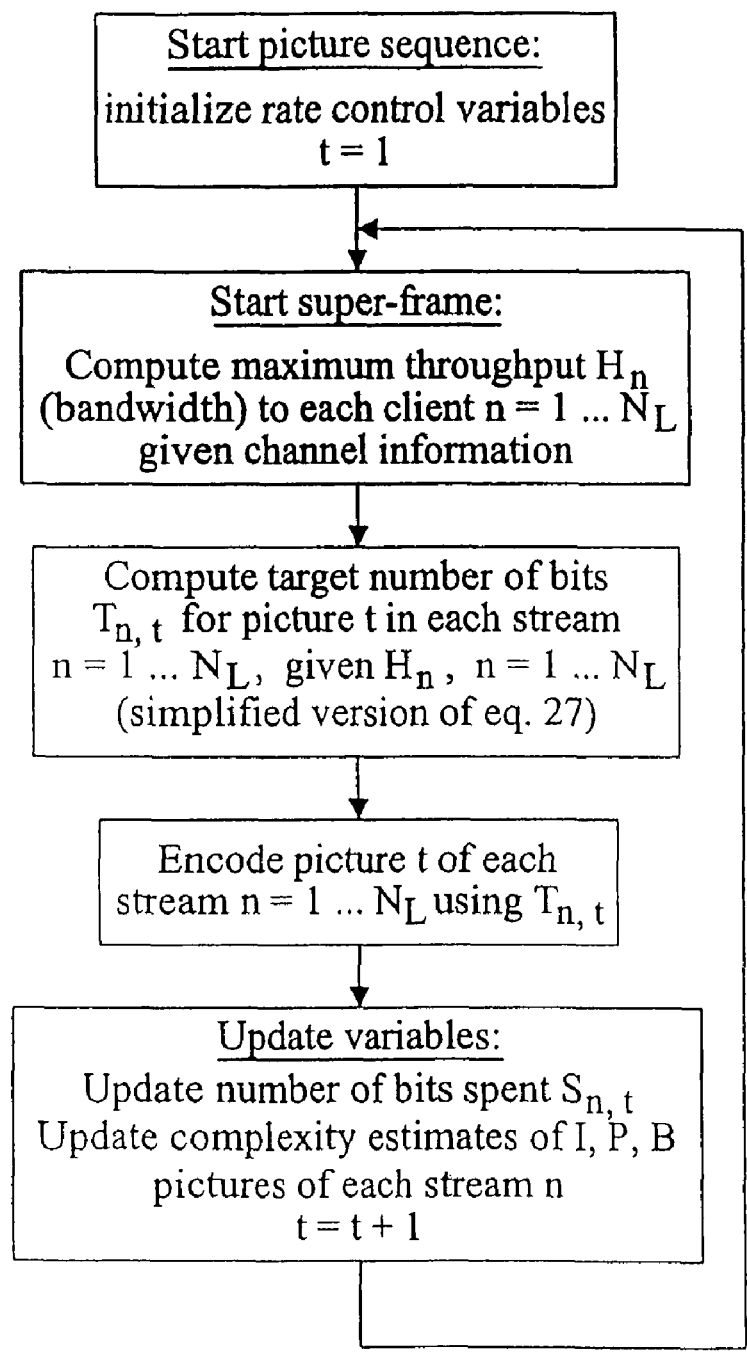
FIG. 14 illustrates dynamic channel conditions of super frame by super frame bit allocation.

Note further, that the above method can be applied in the case where GOPs are not used, i.e., the above method can be applied on a frame-by-frame basis, instead of on a GOP-by-GOP basis (see FIG. 14). For instance, there may be cases where only P-type pictures are considered, and rate control is applied on a frame-by-frame basis. In this case, there is a need to allocate bits to individual frames from a set of $N_L$ co-occurring frames from different video streams. The above method can still be used to assign a target number of bits to each frame, in accordance to the relative coding complexity of each frame within the set of frames from all streams.

Figure 7:
FIG. 7 illustrates an analog source single stream.

One embodiment uses a single-stream system, as illustrated in FIG. 7. This single-stream system has a single analog AV source. The analog AV source is input to a processing module that contains an AV encoder that produces a digitally compressed bit stream, e.g., an MPEG-2 or MPEG-4 bit stream. The bit rate of this bit stream is dynamically adapted to the conditions of the channel. This AV bit stream is transmitted over the channel. The connection between transmitter and receiver is strictly point-to-point. The receiver contains an AV decoder that decodes the digitally compressed bit stream.

Figure 8:
FIG. 8 illustrates a digital source single stream.

Another embodiment is a single-stream system, as illustrated in FIG. 8. This single-stream system has a single digital AV source, e.g. an MPEG-2 or MPEG-4 bit stream. The digital source is input to a processing module that contains an transcoder/transrater that outputs a second digital bit stream. The bit rate of this bit stream is dynamically adapted to the conditions of the channel. This AV bit stream is transmitted over the channel. The connection between transmitter and receiver is strictly point-to-point. The receiver contains an AV decoder that decodes the digitally compressed bit stream.

Figure 9:
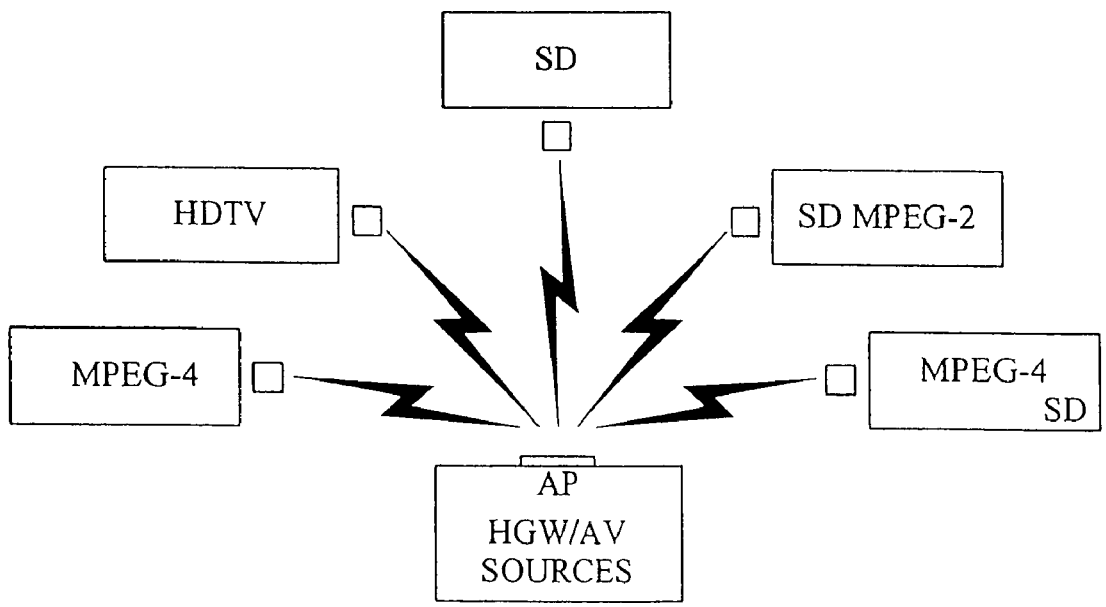
FIG. 9 illustrates multiple streams.

Another embodiment is a multi-stream system, as illustrated in FIG. 9. This multi-stream system has multiple AV sources, where some sources may be in analog form, and other sources may be in digital form (e.g., MPEG-2 or MPEG-4 bit streams). These AV sources are input to a processing module that contains zero or more encoders (analog inputs) as well as zero or more transcoders (digital inputs). Each encoder and/or transcoder produces a corresponding output bitstream. The bit rate of these bit streams are dynamically adapted to the conditions of the channel, so as to optimize the overall quality of all streams. The system may also adapt these streams based on information about the capabilities of receiver devices. The system may also adapt streams based on information about the preferences of each user. All encoded/transcoded bit streams are sent to a network access point, which transmits each bit stream to the corresponding receiver. Each receiver contains an AV decoder that decodes the digitally compressed bit stream.

Channel Bandwidth Estimation

The implementation of a system may estimate the bandwidth in some manner. Existing bandwidth estimation models have been primarily based on the estimation of the network capacity over a distributed network of interconnected nodes, such as the Internet. Typically there are many interconnected nodes, each of which may have a different bandwidth capacity. Data packets transmitted through a set of relatively fast nodes may be queued for transmission through a relatively slow node. To attempt to estimate the bottleneck bandwidth over a communication network a series of packets may be transmitted from the server through a bottleneck link to the client. By calculating the temporal spacing between the received packets, the client may estimate the bandwidth of the bottleneck node. Accordingly, the temporal spacing of packets occurs as a result of a relatively slow network connection within the many network connections through which the data packets are transmitted. This temporal spacing does not measure a rate of change of the network bandwidth in terms of a relatively short time frame, such as less than 1 second, but rather is a measure whatever link is the network bottleneck when measured on a periodic basis, such as every few minutes. Moreover, the physical bottleneck node has a tendency to change over time as the traffic across the distributed network changes, such as the Internet.

Other techniques for estimating the bandwidth of distributed networks involves generating significant amounts of test data specifically for the purpose of estimating the bandwidth of the network. Unfortunately, such test data presents a significant overhead in that it significantly lowers the bandwidth available for other data during the test periods. In many cases the test data is analyzed in an off-line manner, where the estimates are calculated after all the test traffic was sent and received. While the use of such test data may be useful for non-time sensitive network applications it tends to be unsuitable in an environment where temporary interruptions in network bandwidth are undesirable, and where information about link bandwidth is needed substantially continuously and in real time.

It would also be noted that the streaming of audio and video over the Internet is characterized by relatively low bit rates (in the 64 to 512 Kbps range), relatively high packet losses (loss rates up to 10% are typically considered acceptable), and relatively large packet jitter (variations in the arrival time of packets). With such bit rates, a typical measurement of the bandwidth consists of measuring the amount of the packet loss and/or packet jitter at the receiver, and subsequently sending the measured data back to the sender. This technique is premised on a significant percentage of packet loss being acceptable, and it attempts to manage the amount of packet loss, as opposed to attempting to minimize or otherwise eliminate the packet loss. Moreover, such techniques are not necessarily directly applicable to higher bit rate applications, such as streaming high quality video at 6 Mbps for standard definition video or 20 Mbps for high definition video.

The implementation of a system may be done in such a manner that the system is free from additional probing "traffic" from the transmitter to the receiver. In this manner, no additional burden is placed on the network bandwidth by the transmitter. A limited amount of network traffic from the receiver to the transmitter may contain feedback that may be used as a mechanism to monitor the network traffic. In the typical wireless implementation there is transmission, feedback, and retransmission of data at the MAC layer of the protocol. While the network monitoring for bandwidth utilization may be performed at the MAC layer, one implementation of the system described herein preferably does the network monitoring at the APPLICATION layer. By using the application layer the implementation is less dependent on the particular network implementation and may be used in a broader range of networks. By way of background, many wireless protocol systems include a physical layer, a MAC layer, a transport/network layer, and an application layer.

When considering an optimal solution one should consider (1) what parameters to measure, (2) whether the parameters should be measured at the transmitter or the receiver, and (3) whether to use a model-based approach (have a model of how the system behaves) versus a probe-based approach (try sending more and more data and see when the system breaks down, then try sending less data and return to increasing data until the system breaks down). In a model-based approach a more optimal utilization of the available bandwidth is likely possible because more accurate adjustments of the transmitted streams can be done.

The parameters may be measured at the receiver and then sent back over the channel to the transmitter. While measuring the parameters at the receiver may be implemented without impacting the system excessively, it does increase channel usage and involves a delay between the measurement at the receiver and the arrival of information at the transmitter.

MAC Layer

Figure 18:
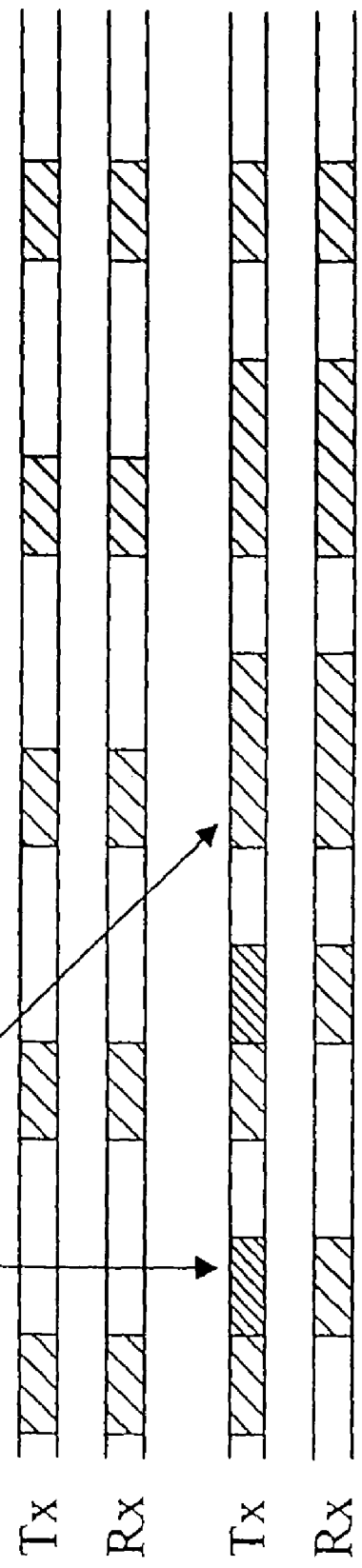
FIG. 18 illustrates an MAC layer model.

Alternatively, the parameters may be measured at the transmitter. The MAC layer of the transmitter has knowledge of what has been sent and when. The transmitter MAC also has knowledge of what has been received and when it was received through the acknowledgments. For example, the system may use the data link rate and/or packet error rate (number of retries) from the MAC layer. The data link rate and/or packet error rate may be obtained directly from the MAC layer, the 802.11 management information base parameters, or otherwise obtained in-some manner. For example, FIG. 18 illustrates the re-transmission of lost packets and the fall-back to lower data link rates between the transmitter and the receiver for a wireless transmission (or communication) system.

In a wireless transmission system the packets carry P payload bits. The time T it takes to transmit a packet with P bits may be computed, given the data link rate, number of retries, and a prior knowledge of MAC and PHY overhead (e.g., duration of contention window length of header, time it takes to send acknowledgment, etc.). Accordingly, the maximum throughput may be calculated as P/T (bits/second).

Application Layer

As illustrated in FIG. 19, the packets are submitted to the transmitter, which may require retransmission in some cases. The receiver receives the packets from the transmitter, and at some point thereafter indicates that the packet has been received to the application layer. The receipt of packets may be used to indicate the rate at which they are properly received, or otherwise the trend increasing or decreasing. This information may be used to determine the available bandwidth or maximum throughput. FIG. 20 illustrates an approach based on forming bursts of packets at the transmitter and reading such bursts periodically into the channel as fast a possible and measure the maximum throughput of the system. By repeating the process on a periodic basis the maximum throughput of a particular link may be estimated, while the effective throughput of the data may be lower than the maximum.

Figure 21:
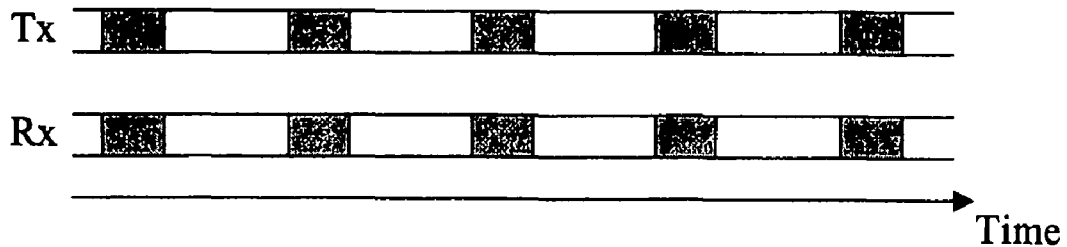
FIG. 21 illustrates ideal transmission and receiving.

Referring to FIG. 21, the technique for the estimation of the available bandwidth may be based upon a single traffic stream being present from the sender to the receiver. In this manner, the sender does not have to contend for medium access with other sending stations. This single traffic stream may, for instance, consist of packets containing audio and video data. As illustrated in FIG. 21, a set of five successful packet transmissions over time in an ideal condition of a network link is shown, where Tx is the transmitter and Rx is the receiver. It is noted that FIG. 21 depicts an abstracted model, where actual transmission may include an acknowledgment being transmitted from the receiver to the transmitter, and intra-frame spacings of data (such as prescribed in the 802.11 Standard). In the actual video data stream having a constant bit rate, the packets are spaced evenly in time, where the time interval between data packets is constant and determined by the bit rate of the video stream, and by the packet size selected.

Figure 22:
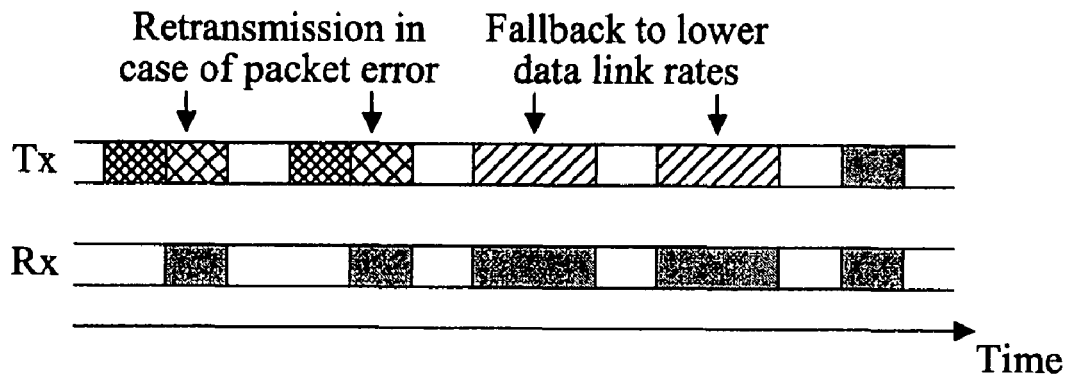
FIG. 22 illustrate retransmission and fallback to lower data rates.

Referring to FIG. 22 a sequence of five packets is shown under non-ideal conditions. After the application has transmitted some of the packets, the transmitter retransmits some of the packets because they were not received properly by the receiver, were incorrect, or an acknowledgment was not received by the transmitter. The retransmission of the packets automatically occurs with other protocol layers of the wireless transmission system so that the application layer is unaware of the event. As illustrated in FIG. 22, the first two packets were retransmitted once before being properly received by the receiver. As a result of the need to retransmit the packets, the system may also automatically reverts to a slower data rate where each packet is transmitted using a lower bit rate. The 802.11a specification can operate at data link rates 6, 9, 12, 18, 24, 36, 48, or 54 Mbps and the 802.11b specification can operate at 1, 2, 5.5, or 11 Mbps. In this manner the need for retransmission of the packets is alleviated or otherwise eliminated.

Figure 23:
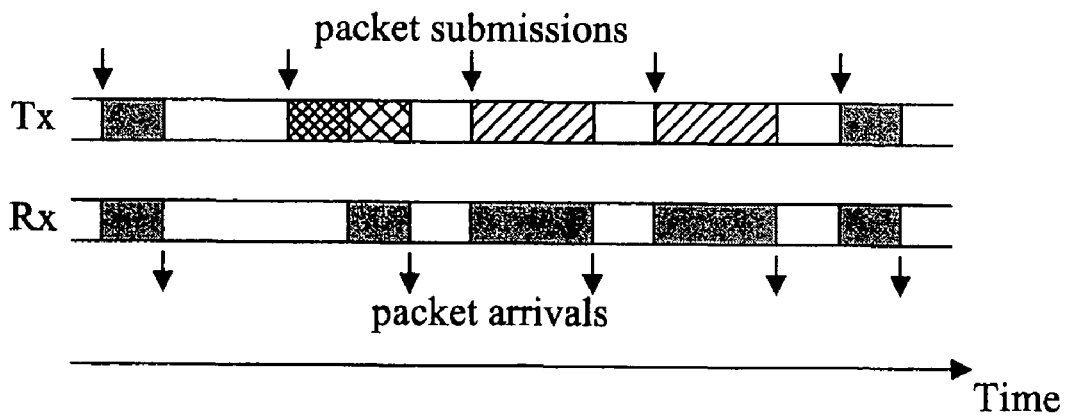
FIG. 23 illustrates pack submissions and packet arrivals.

Referring to FIG. 23, the present inventors considered the packet submissions to be transmitted from the application, illustrated by the arrows. As it may be observed, there is one retransmission that is unknown to the application and two changes in the bit rate which is likewise unknown to the application. The application is only aware of the submission times of the packets to be transmitted. The packet arrivals at the application layer of the receiver are illustrated by the arrows. The packets arrive at spaced apart intervals, but the application on the receiver is unaware of any retransmission that may have occurred. However, as it may be observed it is difficult to discern what the maximum effective bandwidth is based upon the transmission and reception of the packets shown in FIG. 23.

Figure 24:
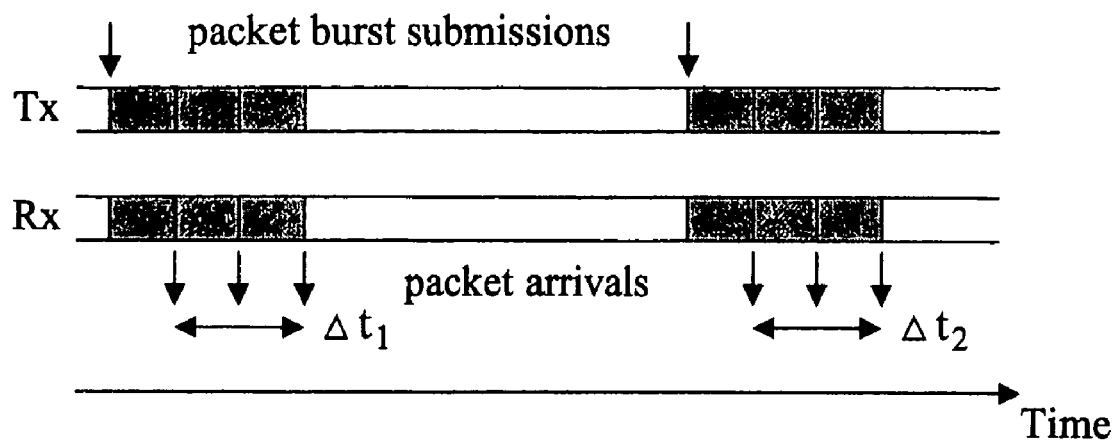
FIG. 24 illustrates pack burst submissions and arrivals.

After consideration of the difficulty, the present inventor determined that to effectively measure the bandwidth available, a group of packets should be provided to the transmitter in a manner as fast as the transmitter will accept the packets or otherwise without substantial space between the packets in comparison with the normal speed at which they would be provided to the transmitter, for the average bit rate of the video. Referring to FIG. 24, the burst of packets is preferably a plurality, and more preferably 3 or more. Subsequently, the packets are submitted by the transmitter through the wireless network, to the receiver. At the receiver, the arrival of the individual packets in each burst is timed.

In many cases, the transmission of packets across the wireless network is at an average data rate less than the maximum data rate. Accordingly, the transmitter may buffer a plurality of packets together temporarily that is received for transmission. The data packets may arrive at the transmitter portion of the system at regular intervals, for example, if they come from a video encoder or transcoder that is operating at a constant bit rate. After the buffering, the transmitter may attempt to send the buffered packets as a burst, i.e., at the maximum sending rate. The transmitter may continue to buffer additional groups of packets to form additional bursts, as desired.

One desired result of sending packets in such bursts is that the overall throughput of the system is approximately equal to the target bit rate of the streaming video. The effective throughput, E, can be modified by controlling the following three parameters:

(1) The packet size (e.g., in the number of bytes), or the size of the data payload of each packet; and/or
(2) The number of packets in each burst of packets; and/or
(3) The time interval between subsequent burst of packets.

By way of example, if a payload size of 1472 bytes, and the number of packets in the burst is 10, and the time interval between bursts is 40 milliseconds, the effective throughput is: 10 (packets per burst)×1472 (bytes per packet)×8 (bits per byte)/0.040 (seconds per burst)=2,944,000 bits per second, or approximately 2.9 Mbps. Therefore, an audiovisual stream with a bit rate of 2.9 Mbps can be streamed at that rate using that wireless connection. It may be observed, that the packets are the actual video signal and not merely additional test traffic imposed on the network. In addition, the system may sequentially transmit the packet bursts in a manner such that the average data rate matches (within 10%) the video bit rate. In this manner, the system may have a continuous measurement of the available video bandwidth, while permitting the average video rate to remain unchanged.

Figure 25:
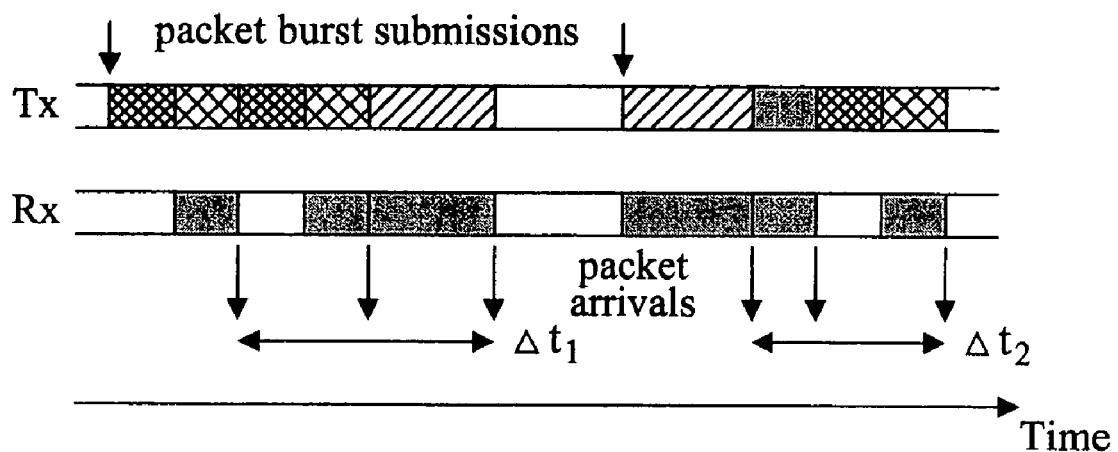
FIG. 25 illustrates packet burst submissions and arrivals with errors.

The effective throughput of a system is always lower than (or equal to) the bandwidth or maximum throughput that the channel can support. Bandwidth or the maximum throughput may be denoted as H. For example, it is known that in ideal conditions an 802.11b link in DCF mode can support a maximum throughput (bandwidth) of approximately 6.2 Mbps—if the payload size is 1472 bytes per packet, and the underlying link rate is 11 Mbps. In non-ideal conditions this maximum throughput or bandwidth will be lowered, due to re-transmissions and lowering of link rates. Naturally, the effective throughput can never exceed the maximum throughput. The ideal situation is illustrated in FIG. 24 while the non-ideal situation is illustrated in FIG. 25. In the case shown in FIG. 24 the channel actually may support a higher throughput, up to a maximum throughput, of $H=H_A$ Mbps. Therefore, $E_S<H_A$ and there is space for additional traffic. In the case shown in FIG. 25 the maximum throughput drops because the underlying MAC uses more of the capacity of the channel to transmit the packets in the data stream and there is less room for additional traffic. The maximum throughput in this case, say $H=H_B$ is lower than the case shown in FIG. 24: $H_B<H_A$. The effective throughput can still be supported: $E_S<H_B$ holds as well.

It is the maximum throughput or bandwidth H that is estimated, in order to provide the transmitter with the right information to adapt the audio/video stream bandwidth (if necessary). The maximum throughput is achieved, albeit temporarily, during transmission of a packet burst. Therefore, the maximum throughput is estimated by computing the ratio of the number of bits transmitted during a burst, and the time duration of that burst. More precisely, consider a burst of N packets ($N \geq 2$) arriving at the receiver, where packet i, $1 \leq i \leq N$, in that burst arrives at time $t_i$ (in seconds). Note that at the receiver it may not know the time at which the sender submitted the first packet to the network for transmission. As shown in FIGS. 24 and 25, during the time interval $\Delta t = t_N - t_1$ between the arrival of the first and the last packet of a burst, the network is busy transmitting packets 2 to N (all packets in the burst except the first). If one assumes that each packet in a burst carries the same payload P bits, then the amount of bits transmitted during the interval $\Delta t$ is equal to $P*(N-1)$ bits. Therefore, the maximum throughput or bandwidth at the time of this burst is:

$$H = \frac{P \cdot (N-1)}{t_N - t_1}$$

More generally, one may denote the maximum throughput or bandwidth for a burst j by $H_j$. The payload of packets during burst j is $P_j$ (all packets during a burst have the same payload). The number of packets in burst j is $N_j$. The time of arrival of packet i in burst j is $t_{j,i}$ and the time interval measured for burst j is $\Delta t_j = t_{j,N} - t_{j,i}$.

It is noted that the receiver may also utilize time stamps measured at the sender side, if the sender embeds those time stamps into the packet payload. The packet payload may also include a packet sequence number. The packet payload may also include a burst sequence number. Such sequence numbers may be used by the receiver to detect packet losses. The packet payload may also contain a field that indicates that a packet is the first packet in a burst, and/or a field that indicates that a packet is the last packet in a burst, and/or a field that indicates that a packet is neither the first nor the last packet in a burst.

Time stamps or measurements of time and time intervals can be provided by clocks internal to the hardware/software platform. Note that different hardware/software platforms may offer different APIs and may support clocks with different performance in terms of clock resolution (or granularity). For example, on a Linux platform, the gettimeofday( ) API is available, which provides time values with microsecond resolution. As another example, on a Windows 2000/Windows XP platform (Win32 API), the GetTickCount( ) and QueryPerformanceCounter( ) APIs are available. The latter API can be used to retrieve time values with sub-millisecond resolution. The actual resolution of the time values provided by the QueryPerformanceCounter( ) API depends on the hardware. For example, this resolution was found to be better than microsecond resolution on two different Windows 2000 laptop PCs, and was found to be better than nanosecond resolution on a newer Windows XP desktop PC.

The bandwidth measurements may be done on an ongoing basis, that is, more than just once. Every burst of data packets during the streaming of audio/video data may be used to estimate bandwidth available during transmission of that burst. Such measurements performed at the receiver are sent back to the sender.

A test setup was implemented using software running on two Windows 2000 laptop PCs, both equipped with IEEE 802.11b WLAN client cards. These WLAN cards on these laptops were configured to communicate in the 802.11 ad-hoc mode, and the IP protocol settings were configured to create a 2 laptop private network. Software running on one PC acted as a server, sending packets over the network to the receiver using the UDP, IP and 802.11b protocols. Note that UDP may be used instead of TCP, as UDP is more suitable for real-time traffic. It is noted that the system may use other protocols, such as for example, the Powerline Communication networks or other LANs.

The first example illustrates throughput performance of 802.11b in a generally ideal case, where the laptop PCs were located close to each other, and interference from external sources was minimized. The 802.11b cards were configured to communicate at the maximum 11 Mbps link rate. The packet payload was constant at 1472 bytes (an additional 28 bytes are used by UDP and IP, such that the 802.11 MAC delivered 1500 byte packets). Each experiment consisted of transmission of 100 bursts. In this example, each burst consisted of 10 packets and the time between subsequent bursts was scheduled to be 40 ms. Therefore, effective throughput in this case is approximately 2.9 Mbps.

Figure 26:
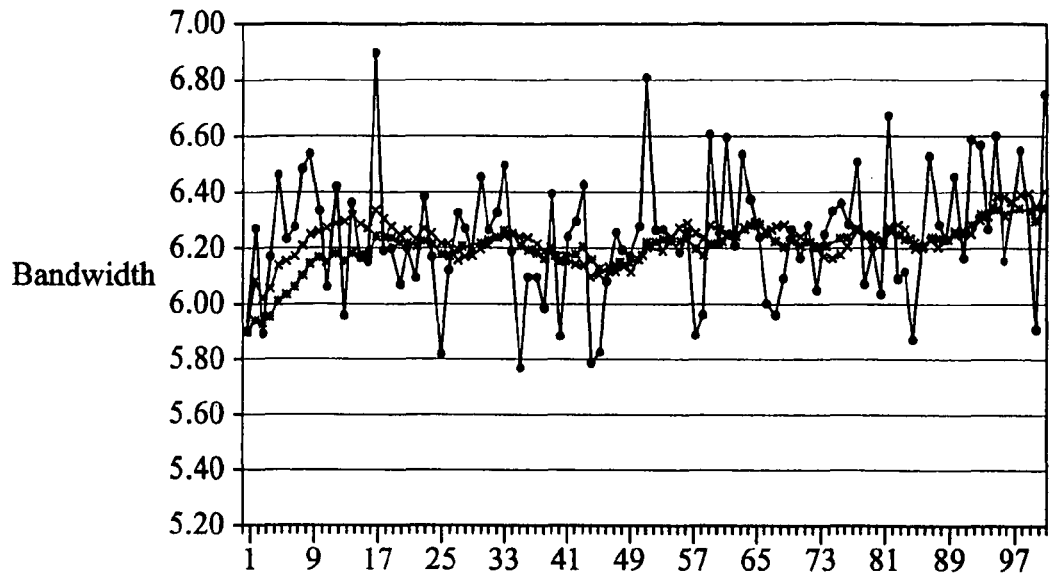
FIG. 26 illustrates measured maximum bandwidth using packet burst under ideal conditions.

Results for the ideal conditions are shown in FIG. 26. From other measurements, it is known that the maximum throughput/bandwidth in this case is 6.2 Mbps on average. Note that the bandwidth varies somewhat around the 6.2 Mbps value; the average value over 100 bursts is 6.24 Mbps and the standard deviation is 0.22 Mbps. The average value over 100 burst is very close to the expected value, and the standard deviation is reasonably small. Methods to handle the variations are discussed in the next section.

The second example illustrates throughput performance of 802.11b in generally non-ideal conditions, where the laptop PCs were located much further away from each other, at a distance of 43 m, in an indoor environment containing many cubicles, and a few walls between the sender and receiver. All other parameters were the same as in the first example.

Figure 27:
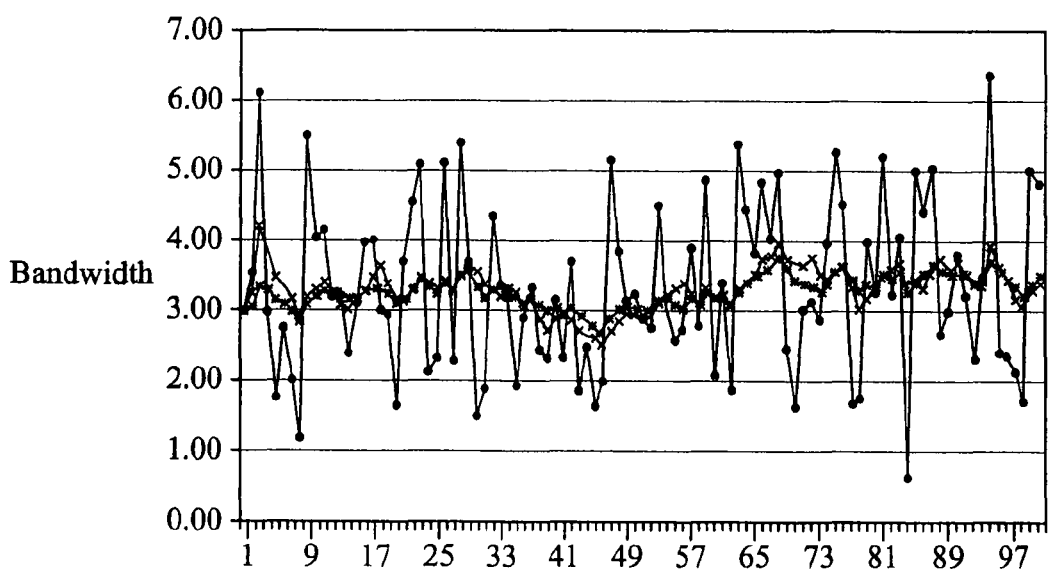
FIG. 27 illustrates measured maximum bandwidth using packet burst under non-ideal conditions.

Results for the non-ideal case are shown in FIG. 27. The maximum throughput in this case is much lower: 3.3 Mbps on average over 100 bursts. The standard deviation over 100 bursts is much higher: 1.20 Mbps. The diagram shows the decreased throughput performance and the increased variations in performance (note that the vertical axis has a different scale in FIG. 26 and FIG. 27).

From this second example, it is noted that the variation in measured bandwidth values may be a useful parameter in itself to use as feedback in an audio/video streaming system—as an alternative to estimating bandwidth directly.

Robustness

Measurements of bandwidth are subject to temporal variations under most conditions, as illustrated in FIGS. 26 and 27. Some of these variations, generally referred to as noise, are not meaningful in the context of wireless broadcasting. It was determined that one source of errors is caused by the (limited) resolution of the clock used to measure packet arrival times. With such errors present it is desirable to provide a robust estimate of (instantaneous) bandwidth that can be used as input to a rate adaptation mechanism at the audio/video encoder at the sender.

There exists a trade-off between the number of packets in a burst and the robustness of the bandwidth estimate. Robustness of the bandwidth estimate can be increased by using a larger number of packets per burst. For example, using bursts with more than two packets reduces the effects of limited resolution of the measurement clock. However, increasing the number of packets per burst means the buffer size at the sender side must be increased, resulting in higher cost of implementation, and higher transmission delays.

The examples shown in FIGS. 26 and 27 assumed a burst size of 10 packets; however, any suitable number of packets may be used. Some temporal variations in the estimates of bandwidth typically remains as the number of packets is increased to its practical maximum. The processing of either the bandwidth estimates or of the measured time intervals may be used to reduce the variations. Processing techniques may be applied to compute a final estimate of the bandwidth.

Traditional techniques applicable to measuring Internet bottleneck bandwidth use a frequency distribution (histogram) of a set of bandwidth estimates and take either the mean, median or mode(s) of that distribution as the final bandwidth estimate. The approach is partly based upon viewing the data as a set of data to be collected, and thereafter processed. However, the present inventor has determined that such techniques are not appropriate for real-time bandwidth estimation in WLANs. One of the principal reasons the present inventor determined that such techniques are inappropriate is that it takes several seconds before enough bandwidth samples can be collected to form a meaningful frequency distribution. However, in the case of video over a wireless network, the channel is subject to variations on a much smaller (subsecond) timescale and the system should be able to respond to those changes in a much faster manner.

To overcome this limitation of a set-based premise, the present inventor determined that the data should be analyzed as a sequential set of measurement samples, as opposed to viewing the data as a set of data to be collected, and thereafter processed. In this manner, the temporal nature of the data becomes important. The data may be treated as a set of measurement samples as a time sequence, i.e., as a discrete time signal. Accordingly, if the samples are received in a different order the resulting output is different. Assuming the measurement samples are spaced equidistantly in time, various signal processing techniques can be applied to eliminate "noisy" variations, including but not limited to the following.

(1) FIR filtering. Non-recursive filtering with a finite number of filter tabs. One example is a moving average filter. FIGS. 26 and 27 illustrate the effect of a 10 tab moving average filter on the sequence of bandwidth measurement samples.

(2) IIR filtering. Recursive filtering with a finite number of filter tabs. One example is a first-order recursive filter that weights both the previous estimate with the current measurement sample to compute a new estimate. FIGS. 26 and 27 illustrate the effect of a first order IIR filter on the sequence of bandwidth measurement samples.

(3) Statistical processing. Mean square error (MSE) estimates, maximum a posteriori (MAP) estimates, Wiener filtering, Kalman filtering. Statistical processing provides a particularly convenient framework, because it allows one to both filter samples and predict future values as the same time. Forming a prediction is important since the results of the measurements are used to control the rate of audio/video data transmitted in the (near) future.

(4) Curve fitting. Fitting curves, such as straight lines, splines, and other, allows interpolation, approximation and extrapolation from the noisy data samples. Curve fitting is especially useful in case the measurement samples are not spaced exactly equidistantly in time.

In each of these methods, the additional processing to compute a final estimate for the bandwidth at burst j may utilize a limited number of bandwidth samples from the past $H_m$, $j-M_1 \leq m \leq j$, and may also utilize a limited number of final bandwidth estimates from the past $H^*_m$, $j-M_2 \leq m \leq j-1$. One embodiment may, for example, utilize a first order IIR type of filter as follows:

$$H^*_j = (1-w) \cdot H^*_{j-1} + w \cdot H_j$$

where w is a parameter between 0 and 1. For instance, if w=0.5, the final estimate of bandwidth at burst j is computed by weighting equally the previous final estimate of the bandwidth at burst j-1 and the current bandwidth sample for burst j. The parameter w controls the amount of smoothing or averaging applied to the bandwidth samples, where the amount of smoothing is high when w is low, and the amount of smoothing is low when w is high. This parameter may be held constant; alternatively, one may change this parameter adaptively. This technique was used in the examples in FIGS. 26 and 27, where the value of w was 0.1.

Note that instead of filtering or processing bandwidth samples $H_j$, one may also filter or process measured time intervals $\Delta t_j$ before computing bandwidth values using $$H = \frac{P \cdot (N-1)}{t_N - t_1}.$$

In that case, one may utilize samples of measured time intervals intervals from the past $\Delta t_m$, $j-M_1 \leq m \leq j$, as well as a limited number of processed time interval estimates from the past $\Delta t^*_m$, $j-M_2 \leq j-1$, to compute a final estimate of a representative time interval for burst j, $\Delta t^*_j$. Then, one may apply $$H = \frac{P \cdot (N-1)}{t_N - t_1}$$

using this final estimate of the time interval, to compute a final estimate of the bandwidth at burst j, $T^*_j$. One example is to use IIR filtering on the measured time intervals:

$$\Delta t^*_j = (1-w) \Delta t^*_{j-1} + w \Delta t_j$$

followed by:

$$H^*_j = \frac{P_j \cdot (N_j - 1)}{\Delta t^*_j}$$

Such filtering, estimation and prediction techniques allow filtering out an appropriate amount of noisy variations, while's till providing a final estimate quickly.

The measurement results at the receiver are transmitted back to the sender. The sender uses this feedback information to adapt the audio/video being transmitted, especially its rate. The feedback information transmitted from receiver to sender may consist of an estimate of (instantaneous) bandwidth/maximum throughput as computed by the receiver. It may also include raw measurement results, or a partial estimate, which the sender may use to compute a final estimate. It may also include a time stamp, indicating the time at which the estimate was computed, and a sequence number, indicating the packet number or packet burst number. The feedback information may also contain an indication of whether the receiver detected any packet loss.

Feedback information can be sent back to the sender using the same network link that carries the audio/video data. In particular, packets with feedback information can be transmitted between transmission of packet bursts with audio/video data from sender to receiver. Such feedback packets may be sent periodically, for example, after every burst of audio/video packets, or after every K bursts, or whenever desired, for example, only if there is a significant change of the bandwidth performance. The feedback packets only uses a small portion of the available bandwidth for transmission. This overhead should be minimized, i.e., kept small while still allowing the sender to react in a timely fashion. The amount of information in such feedback packets is very small compared to the audio/video data, therefore the bandwidth overhead is very small. Still, the sender may take this small overhead into account in its bandwidth allocation and adaptation strategy.

Figure 28A:
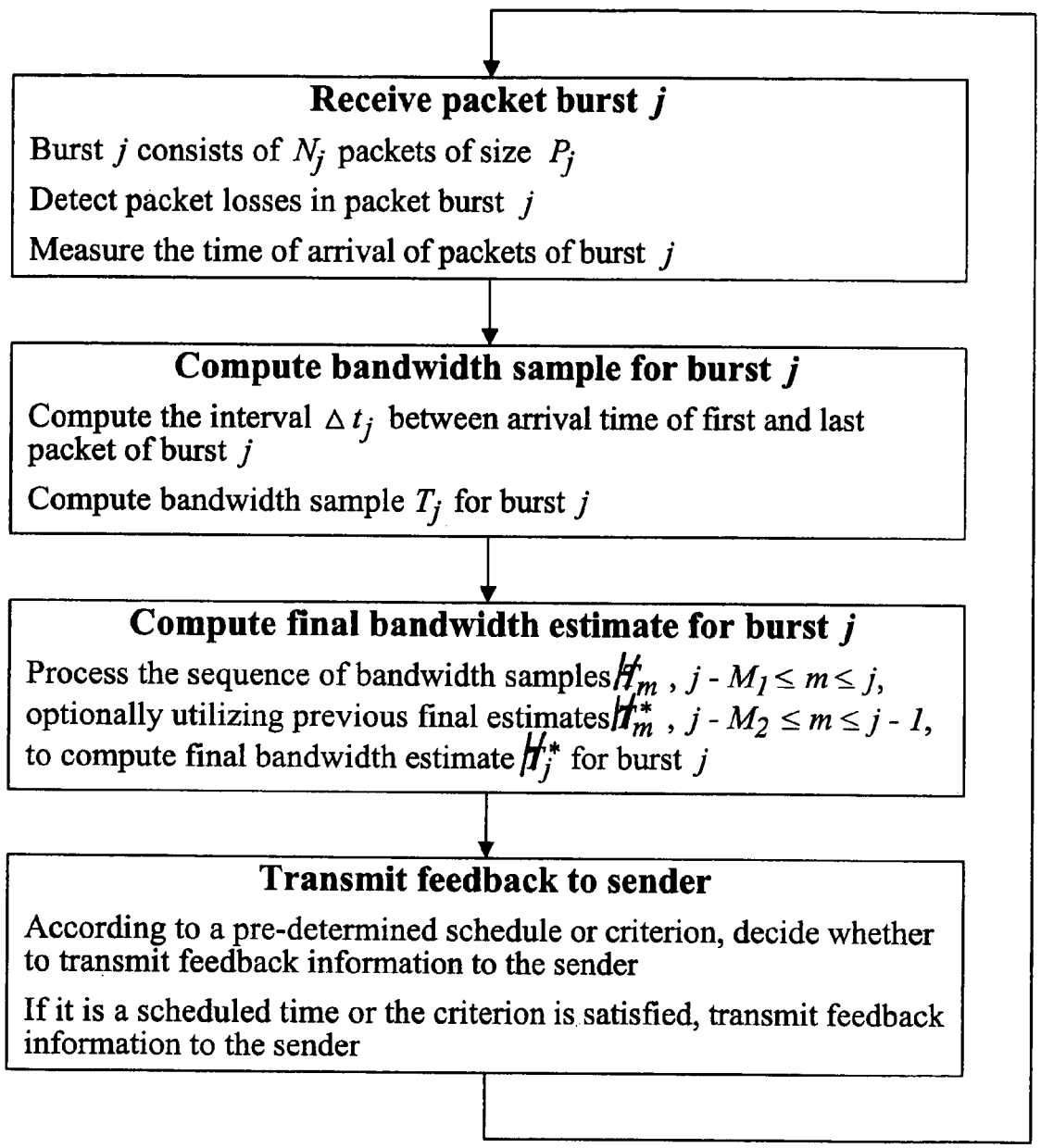
FIGS. 28A-28B illustrates receiving packets.

Referring to FIG. 28A, a flow diagram for an exemplary receiver is shown. The receiver receives the packet bursts j and determines packet losses and measures the arrival of the packets. Then the receiver computes the bandwidth sample for the burst j. Thereafter, the receiver may compute the final bandwidth estimate for the burst j by incorporating the bandwidth of the previous packets. After estimating a final bandwidth the receiver transmits the bandwidth information back to the sender. It is to be understood that the sender may calculate the bandwidth information and bandwidth estimates based upon information from the receiver.

Figure 28B:
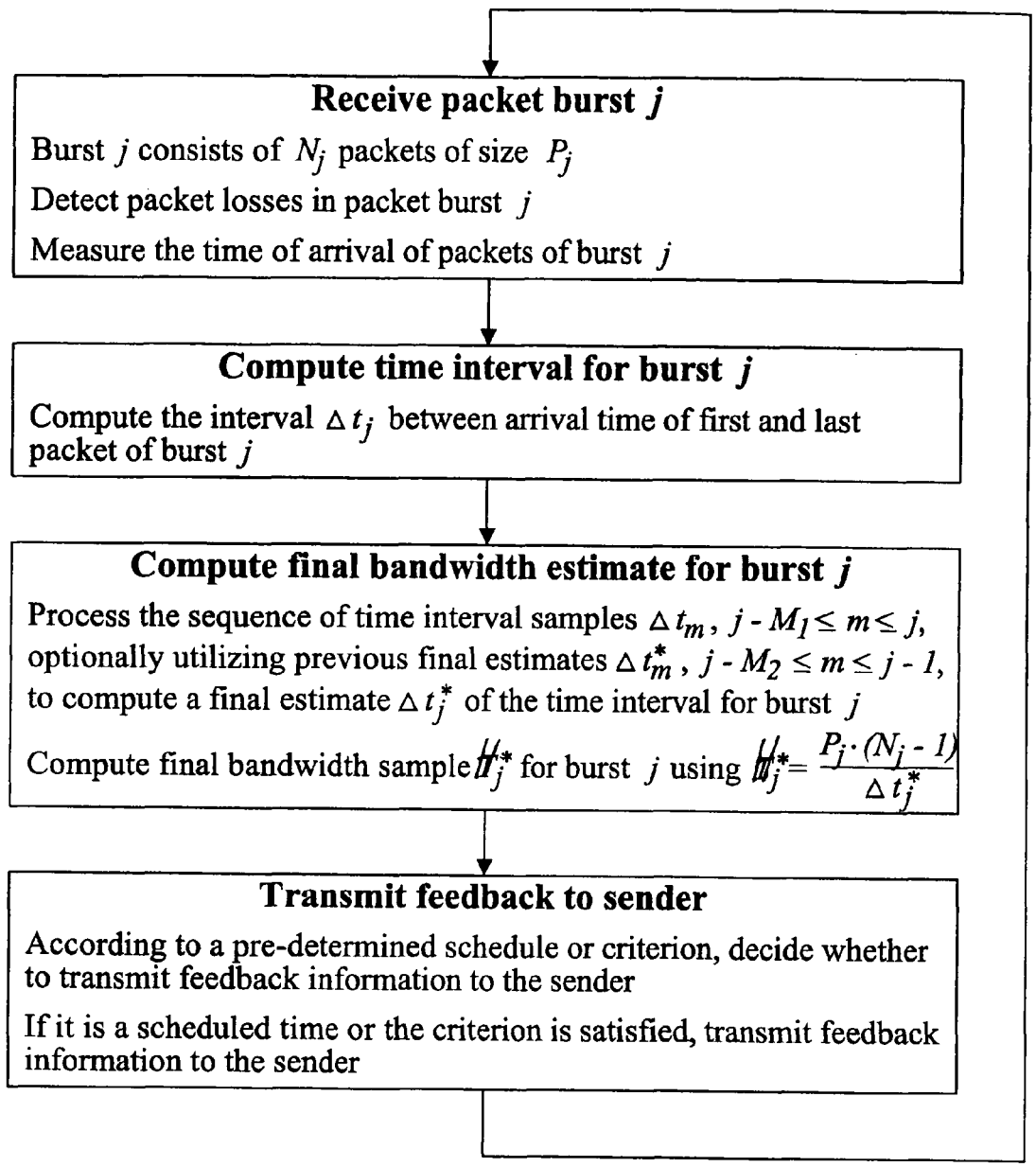

Referring to FIG. 28B, a flow diagram for another exemplary receiver is shown. The receiver receives the packet bursts j and determines packet losses and measures the arrival of the packets. Then the receiver computes the time interval for burst j. Thereafter, the receiver may compute the final bandwidth estimate for the burst j by incorporating the time intervals of the previous packets. After estimating a final bandwidth the receiver transmits the bandwidth information back to the sender. It is to be understood that the sender may calculate the bandwidth information and bandwidth estimates based upon information from the receiver.

Figure 29:
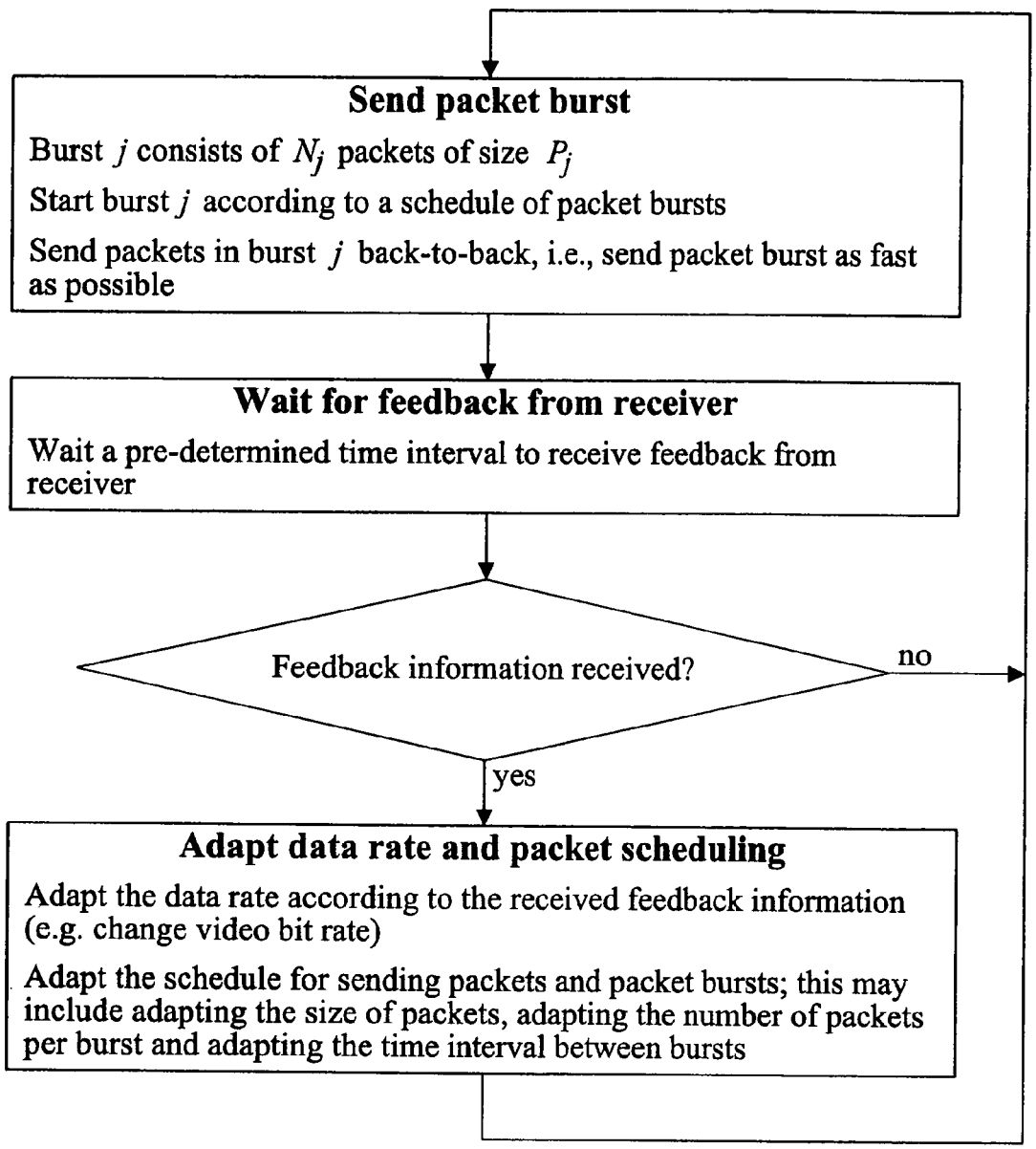
FIG. 29 illustrates transmitting packets.

Referring to FIG. 29, a flow diagram for an exemplary transmitter is shown. The transmitter sends a packet burst to the receiver. The transmitter then waits a pre-determined time interval to receive feedback from the receiver. When the feedback information is received the transmitter may adapt the rate and schedule the packets to the receiver. It is to be understood that the sender may calculate the bandwidth information and bandwidth estimates based upon information from the receiver.

Figure 30:
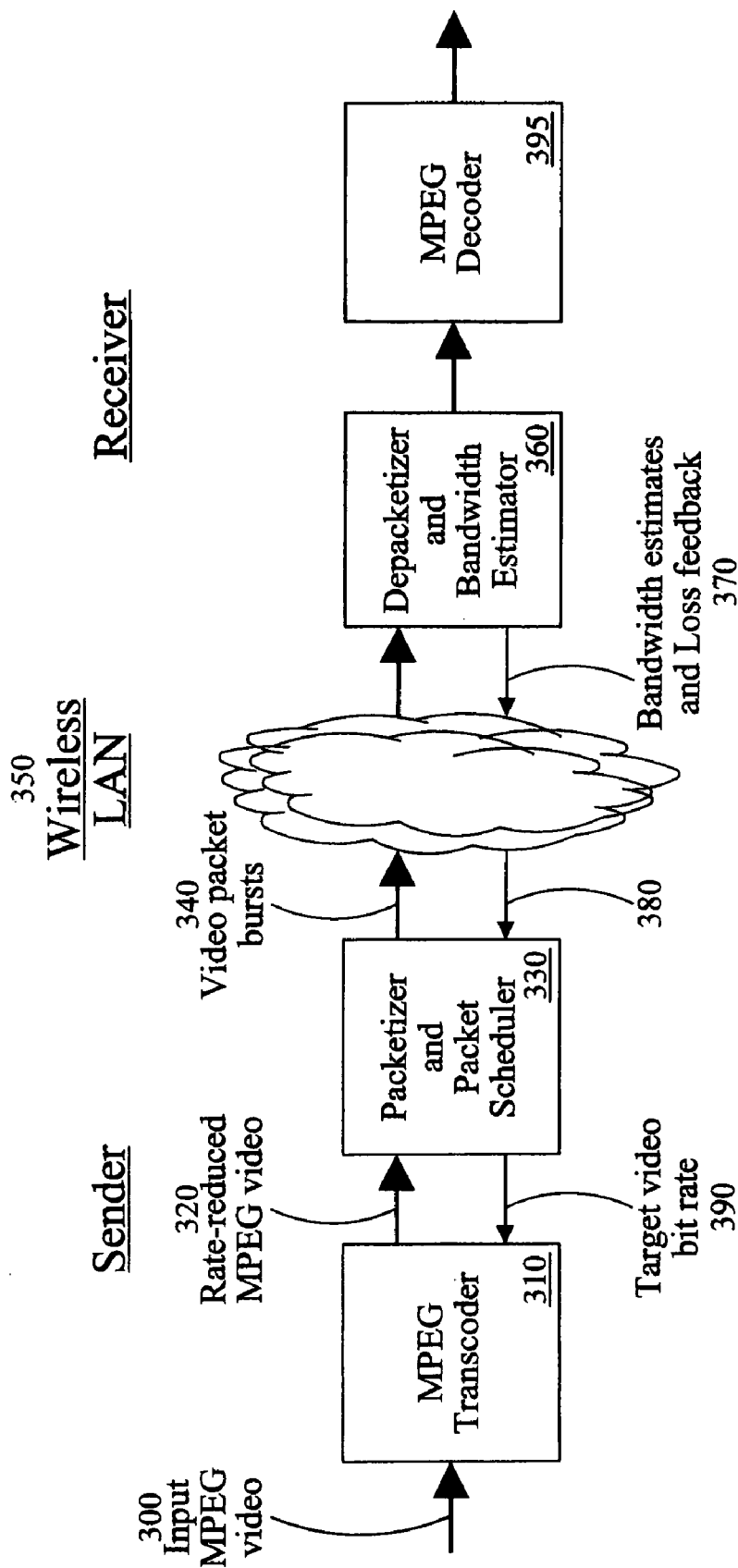
FIG. 30 illustrates a processing system.

Referring to FIG. 30, a wireless broadcasting system may include an input video 300, such as in a MPEG format. The input video 300 is provided to a MPEG transcoder 310 which adapts the video bit rate to the desired data sending rate for one or more video streams. The rate-reduced (or increased) MPEG video 320 is provided to a packetizer and packet scheduler 330 which schedules packets for transmission over the channel, adapting the data sending rate so that is preferably remains generally below the available bandwidth. The video packets 340, in many cases in the form of a "burst", is provided to a wireless network 350. The data from the wireless network 350 is received by a depacketizer and bandwidth estimator 360. The estimator 360 provides a bandwidth estimate and loss feedback 370 to the wireless network 350, which in turn provides data 380 to the scheduler 330. The data 380 is used to determine a target video bit rate 390 provided to the MPEG transcoder 310. The output of the depacketizer 360 is provided to an MPEG decoder 395.

For the system shown in FIG. 30, the bandwidth may be defined as previously described or as the maximum throughput offered by the "lower" network layers to the audio/video application layer at a particular time. The maximum throughput or bandwidth available for transmission of audio/video data may be denoted by H, which is time-varying. The sending rate may be denoted by S and defined by the rate at which the sender submits data to the network. The effective throughput may be denoted by E and defined by the actual throughput of audio/video data realized at any particular time between the sender and the receiver.

It may be observed that the effective throughput may not exceed the maximum throughput or bandwidth at any particular time: $E \leq H$. With a given maximum throughput of the channel, e.g. $H=H_A$ Mbps, the sender transmits data at a rate, e.g. $S=S_A$ Mbps, that is lower than $H_A$ to help ensure that all transmitted data arrives at the receiver without packet losses and in a timely manner. In such as case, the effective throughput, e.g. $E=E_A$ Mbps, is equal to the sending rate $E_A=S_A \leq H_A$.

If the sending rate were to be higher then the bandwidth, some of the data sent would be lost or arrive late, e.g. $S_A \geq H_A=E_A$ Therefore, one feature of the sender is to ensure that $E=S \leq H$ at all or most of the time. The sender controls its sending rate by scheduling the transmission of the audio/video data packets appropriately. Another feature of the sender is to ensure that the bit rate of the video generated, R', is equal to the sending rate, e.g. R'=S. In the single stream embodiment, the sender should achieve $R'=S \leq H$.

As an example, in the case that the bit rate of the original video stream is already lower than the network bandwidth, the transrater does not have to actively lower the bit rate. In fact, the transrater may actively increase the bit rate, if desired. To optimize performance the sender substantially matches the packet sending rate to the video bit rate in order to achieve improved image quality. However, when the bandwidth of the wireless network decreases sufficiently to approach the video bit rate the sender may react to avoid packet losses by appropriately lowering both its sending rate and the transrater output bit rate dynamically.

As previously discussed, one technique to transmit data from the sender to the receiver is to use a "burst" of M packets having a packet size P over a time $\Delta T$. A set of suitable parameters that may be modified in order to control the sending rate include, for example:
 (1) The packet size (e.g., in number of bytes), or the size of the data payload of each packet, P;
 (2) The number of packets in each packet burst, M;
 (3) The time interval between subsequent packet bursts, $\Delta T$.

For purposes of discussion all packets in a single burst will be assumed to have the same payload size. It is to be understood that the payload size may vary from burst to burst, and from packet to packet, as desired. In the case of the same payload size, the sending rate S may be defined as:

$$S = \frac{P \cdot M}{\Delta T}$$

The maximum throughput H is achieved, albeit on a temporary basis, during the transmission of a burst of packets.

After further consideration of effectively adapting the sending rate to match the available bandwidth, the present inventors determined that effectively modifying the packet size provides significant advantages. In many cases, for simplicity of implementation, the number of packets in each burst, M, is maintained as a constant (or 90% or more the same for a period of several bursts), as well as the time interval between bursts (or 90% or more the same for a period of several intervals), $\Delta T$. The system may compute M and $\Delta T$ at the start of a session and maintained constant during the rest of the session; and are therefore assumed a constant at the time of rate adaptation. It is to be understood that the number of packets in each burst, M, and/or the interval between bursts, $\Delta T$, may be modified during a session, if desired.

Adapting the sending rate by varying the packet size (or payload size P) has some advantages over varying the number of packets in a burst, or the time interval between bursts. Varying the number of packets in a burst results in more difficulty for the receiver to detect the first and last packets in a burst (which may be used to estimate bandwidth). Varying the number of packets would likely necessitate the signaling of the position of a packet in a burst (first, last, or neither), which would increase the overhead on the data transmitted. In addition, the number of packets per burst should not be excessively lowered, because the estimate of bandwidth would become more unreliable. The excessive lowering and excessive raising of the number of packets per burst should be limited. Moreover, the system may include a lower threshold of the number of packets to ensure reliability. If desired, the number of packets in a burst may be within the range of 2 to 500, and more preferably from 10 to 50. Also, the number of packets should not be excessively raised, because it would result in a significantly larger buffer at the sending device as well as the increase in the average buffering delay. Accordingly, simply changing the number of packets in a burst, as the sole adaptation measure, may not be sufficiently robust for many applications.

Varying the packet size provides the advantage that better bandwidth utilization may result. In the event that the packet size is lowered when the system detects a degraded channel condition, this will result in an increase in the expected bandwidth that would have otherwise occurred. This is because, in a given channel condition, smaller packets have a higher probability of being transmitted properly (e.g., a lower packet error ration) compared to larger packets. Therefore, smaller packets will result in fewer retransmissions before arriving correctly at the receiver. This automatically has a positive effect on the available bandwidth at the application layer.

It has been determined that it is desirable to decrease the payload size P, and hence the packet size, when the available bandwidth H decreases, and to increase the payload size P, and hence the packet size, when the available bandwidth H increases. As it may be observed, it is desirable to maintain the sending rate S below the available bandwidth H during all (such as 90%, 95%, 99% of the time or more), or substantially all, of the time without being lower than necessary.

The packet size adaptation may be formulated as follows. The sender has obtained (for example from the receiver, or otherwise) an estimate of the available bandwidth/maximum H. The system is aware of the current payload size $P_{current}$ of the packets that have been used while estimating the maximum throughput. The sender also is aware of the current sending rate $S_{current}$. The sender may now determine a different sending rate $S_{next}$ for the next burst or bursts of packets, as well as the next payload size $P_{next}$ to realize that sending rate value.

Another issues that arises in the case of wireless networks is that the bandwidth/maximum throughput depends on the packet size. The maximum throughput that can be achieved with a small packet size is lower than that which can be achieved with a large packet size. Hence, changing the packet size also changes the maximum throughput that can be achieved.

Figure 31:
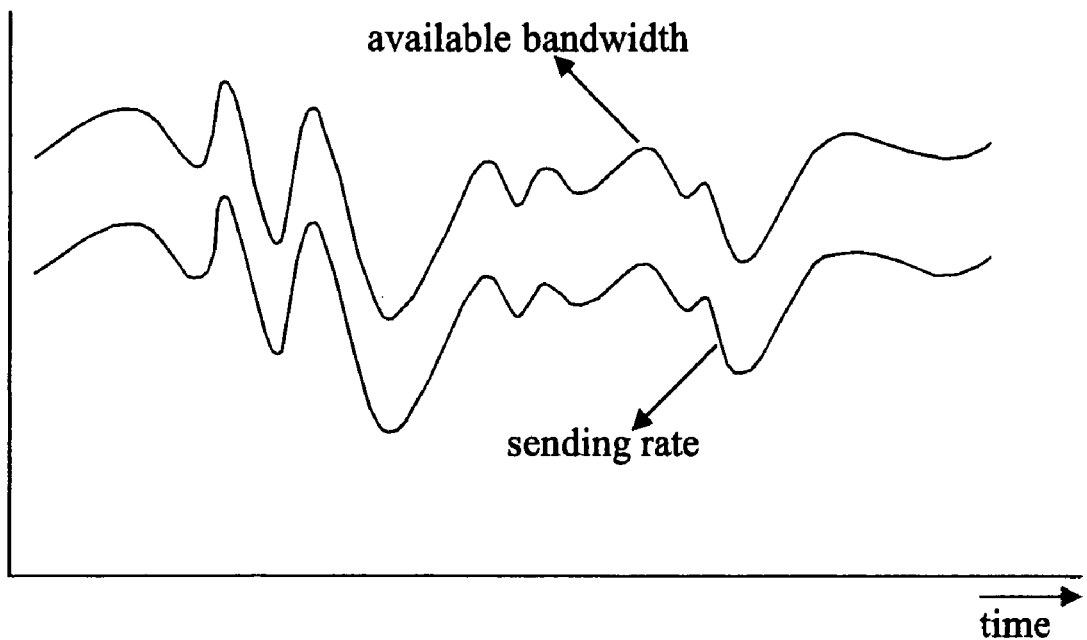
FIG. 31 illustrates an embodiment of available bandwidth and the sending rate.

One potential technique for selecting a sending rate, given an estimate of the available bandwidth, is to compute the payload size $P_{next}$ such that the following relationship is maintained:

$$S_{next} = F \cdot H$$

where F is a bandwidth utilization factor, $0 \leq F \leq 1$. Here, F provides a margin to safeguard against errors in the estimate of the available bandwidth and against any sudden changes in the available bandwidth within short time intervals. While H is based on the recent estimates of the available bandwidth, the system may also consider changes of the bandwidth that may occur between the time of measurement and the time at which the sender is able to utilize such an estimate for rate adaptation. By way of example, a temporal time period of 1 second or less, ½ of a second or less, ¹⁄₁₀th of a second or less, or ¹⁄₁₀₀th of a second or less, may be used as a measure of a time internal over which there is generally increasing bandwidth or generally decreasing bandwidth of the channel. For example, if the estimate of available bandwidth was obtained at the receiver and subsequently transmitted back to the sender, the time interval between computing the estimate and utilizing it may not be negligible. Even if computing the estimate includes techniques for predicting the bandwidth forward in time, such estimates may not be robust. Hence, the system may utilize F to provide an additional safety margin. One implementation of this technique is illustrated in FIG. 31.

For example, if the bandwidth is generally degrading then the estimate of the available bandwidth may be higher than the actual available bandwidth when the data is sent. Alternatively, if the bandwidth is generally improving then the current estimate of the available bandwidth may be lower than the actual available bandwidth when the data is sent. Other functions of F may likewise be used.

In general, other factors may also be taken into consideration when computing a sending rate. For example, in the audio/video streaming environment, the system should not increase (or decrease) the sending rate from one burst to the next significantly, because a sudden increase (or decrease) in a video bit rate (such as a change greater than 10%, 20%, 30%, 40%, or 50% or more) may be readily noticeable to the viewer. In the audio/video streaming environment, the system may permit relatively quick decreases in the sending rate, to respond quickly to any deteriorations of the channel conditions (such as a change greater than 10%, 20%, 30%, 40%, 60%, or 80% or more), while allowing slow increases in the sending rate (such as a change less than 10%, 20%, 30%, 40%, or 50%), thereby providing additional robustness and user desirability. In many cases, the permitted decrease is greater than the permitted increase. Furthermore, if multiple streams are transmitted simultaneously, one may also limit increases (or decreases) in the sending rate depending on the sending rate of other streams. In this manner, the increases (or decreases) are different than they would have otherwise been based upon other streams.

Figure 32:
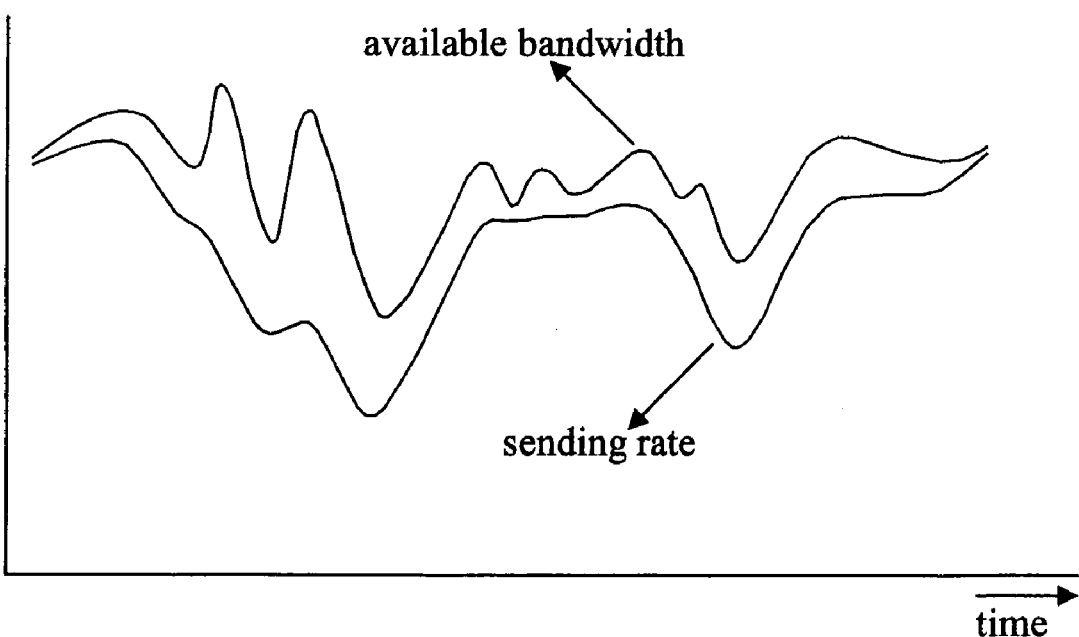
FIG. 32 illustrates another embodiment of available bandwidth and the sending rate.

Another factor that may be taken into account is the amount of variation (over time) in the bandwidth estimate. This is motivated by the fact that in degraded channel conditions, not only will the available bandwidth decrease, but generally the variation in the estimate will increase. Therefore, the magnitude of the variation can be utilized to modify the safety margin that should be maintained between available bandwidth and chosen sending rate. One implementation of this technique is illustrated in FIG. 32.

The previous equation:

$$S_{next} = F \cdot H$$

is generally used in the case that the packet loss did not occur in the previous packet burst(s). In the case where packet loss did occur in the previous burst(s), a different value for the next sending rate may be computed. For example, the minimum sending rate may be selected in this event.

A new payload size $P_{next}$ may be selected in order to achieve the sending rate as prescribed above. As noted above, it is desirable to select $P_{next}$ such that the resulting sending rate $S_{next}$ is proportional to the bandwidth available when using the newly selected $P_{next}$. However, the latter value is unknown to the sender, as it only is aware of the estimate of the available bandwidth, when using the current payload side $P_{current}$. As mentioned above, the available bandwidth may depend on the packet size used.

The previous equation may be more accurately stated as:

$$S_{next} = \frac{P_{next} \cdot M}{\Delta T} = F \cdot H(P_{next})$$

The sender is aware $H(P_{current})$; however $P_{current}$ may or may not be equal to the optimal $P_{next}$ to be selected. In order to select an optimal P, the sender should estimate or otherwise have the available bandwidth expected at the new payload size $P_{next}$.

One technique for the selection of the packet size/payload size is to determine, from theory and/or experiment, the maximum possible available bandwidth for any payload size: $H_{max}(P)$. This maximum available bandwidth is obtained under ideal (or substantially ideal) conditions of the wireless channel, e.g., no retransmissions occurring and the maximum data link rate is used.

The ratio of the measured bandwidth at the current payload size $H(P_{current})$ and the maximum possible bandwidth at this payload size $H_{max}(P_{current})$ may be computed. This ratio is smaller or equal to 1.0 by definition, as the measured bandwidth under the current channel condition is always lower (or equal) to the maximum bandwidth (obtained under ideal cannel conditions). This ratio may then be used to predict the available bandwidth for arbitrary payload size in the current channel condition. One expression for this relationship is as follows:

$$H(P) \approx \frac{H(P_{current})}{H_{max}(P_{current})} \cdot H_{max}(P)$$

Restating this equation in terms of $P_{next}$ results in:

$$\frac{P_{next} \cdot M}{\Delta T} \approx F \cdot \frac{H(P_{current})}{H_{max}(P_{current})} \cdot H_{max}(P_{next})$$

Therefore, the sender may select $P_{next}$ such that the equation holds. It is noted that $H(P_{current})$ is known (as it was measured) and the values of $H_{max}(P_{current})$ and $H_{max}(P_{next})$ are known as well. The latter values can be computed on-line or pre-computed and stored in a look up table for selected values of P.

Another technique for packet selection includes a dependency of the available bandwidth on the wireless channel condition. For a particular transmission system, the condition of the channel may be characterized by the Bit Error Ratio (BER), namely, the probability of bit errors after transmission. The condition of the channel may also be characterized using other characteristics, such as for example, signal to noise ratio. It is noted that the BER is a function of the signal to noise ratio.

The Packet Error Ratio (PER) may be defined as the probability of an entire packet (802.11 data frame in some contexts) containing one or more bit errors. The PER in many cases depends on the BER and the data packet size. Given a fixed BER value, a larger packet size leads to a larger PER. As previously noted, large packets tend to be more prone to errors than small packets. One relationship between PER and BER can be expressed approximately as:

$$PER = 1 - (1 - BER)^b$$

where b is the packet size in number of bits (i.e., 8×P plus MAC/PHY overhead).

The achievable throughput (available bandwidth) depends on the PER and data packet size, protocol overhead, in addition to other factors. The channel condition may be modeled statistically, and the system can compute the expected maximum achievable throughput (expected available bandwidth), denoted by H'. This model is based upon a fixed number of retries by the 802.11 MAC. When the PER is low, a small number of retries is expected to result in a packet arriving successful at the receiver. In this case, the maximum throughput will be high. On the other hand, when the PER is large, a larger number of retries is expected, and a higher probability of a packet loss will result. Under such channel conditions, the maximum throughput will be low.

Therefore, the system is capable of computing the PER from the BER, and to compute expected maximum throughput from the PER, as illustrated in FIG. 33. These relationships may be calculated in many different ways, depending on exactly how one models the underlying statistical processes as well as the wireless (e.g., 802.11) protocols.

Referring to FIG. 34, a tabulation of the expected bandwidth for different values of the payload size P and for different values of the BER for the 802.11b MAC is illustrated. It is noted that FIG. 34 contains expected values of the 802.11b MAC throughput, which may differ from the throughput at the audio/video application layer, due to the use of intermediate protocol layers and associated overhead due to protocol headers. A MAC Service Data Unit (MSDU) contains both the audio/video payload as well as the headers for intermediate protocols, such as UDP and IP. For example, if the audio/video data is transported using UDP and IP on top of 802.11b, an MSDU of 1500 bytes contains 1472 bytes of audio/video application data, because 28 bytes are required by the UDP (8 bytes) and IP (20 bytes) headers. Therefore, actual achievable throughput for audio/video data is slightly lower than the values in the table below. This is taken into account in our adaptation algorithm.

Tables similar to FIG. 34 may be constructed for 802.11a, 802.11g, or other wireless protocols. It is noted that the values of MSDU size and BER in FIG. 34 are examples of typical values, and that other values can be used as appropriate. The column with BER=0 corresponds to the case of ideal channel conditions, and columns further to the right correspond to degrading channel conditions.

The technique may provide rate adaptation as illustrated in FIG. 35. Given an estimate of current available bandwidth at the current payload size $H(P_{current})$, the system may infer the current channel condition using FIG. 34. Specifically, in each row of FIG. 34, the system constructs ranges of bandwidth values, where each range is defined by the midpoint values between two subsequent bandwidth entries in a row. For example, if the current MSDU size is 1500 (corresponding to $P_{current}=1472$ in case UDP/IP are used), the midpoint between the values in the columns with BER=$10^{-7}$ and BER=$10^{-6}$ is (6.237+6.159)/2=6.198 Mbps. Likewise, the midpoint between the values in the columns with BER=$10^{-6}$ and BER=$10^{-5}$ is (6.159+5.408)/2=5.784 Mbps. The values 6.198 Mbps and 5.784 Mbps define a range of rates. If the current MSDU size is 1500 and the current estimated bandwidth value is in that range, the system infers that the BER is approximately $10^{-6}$, thus providing a characterization of the current channel condition.

Subsequently, to find a more optimal payload size under the current channel condition, the system may search the column with the BER found in the previous step, for the row such that the resulting sending rate (with $P_{next}$) is closest to the expected available bandwidth at that $P_{next}$ and that BER, scaled by F.

More precisely, given the BER and given values of expected bandwidth H' for several values of P (from a table such as FIG. 34), the system selects $P_{next}$ as the value of P that minimizes:

$$\left| \frac{P \cdot M}{\Delta T} - F \cdot H'(P, BER) \right|$$

It is noted that FIG. 34 may be entirely pre-computed, for sets of values of P (or MSDU size) and values of the BER, including the bandwidth ranges defined by midpoints between two columns. Therefore, given values of F, M and $\Delta T$, the entire selection process as prescribed by equation directly above may be pre-computed and stored in a look-up table. Therefore, the implementation of the rate adaptation technique may consist of only one or a few table lookups, as detailed below.

The adaptation algorithm described above may be efficiently implemented by a set of look-up tables. This set of tables simply maps a given MSDU size and an estimate of current bandwidth (using the given MDSU size) into a new MDSU size, that is optimal in the channel condition inferred.

To illustrate the operation of the table look-up mechanism, an example is provided below as an example set of tables for the case of 802.11b.

The design of the tables starts out with MSDU sizes in the set:
{1500, 1400, 1300, 1200, 1100, 1000, 900, 800, 700, 600, 500, 400, 300, 200, 100}.

Also, the following BER values may be considered:
{0, $10^{-7}$, $10^{-6}$, $10^{-5}$, $10^{-4.75}$, $10^{-4.5}$, $10^{-4.25}$, $10^{-4}$, $10^{-3.75}$, $10^{-3.5}$, $10^{-3.25}$}.

The number of packets per burst M may be 10.
The time interval between bursts $\Delta T$ may be 30 msec.

In this case, the sending rate (at MAC level) for MSDU size 1500 bytes is 4 Mbps. Note that this corresponds to an audio/video payload of 1472 bytes, and application layer sending rate of 3.925 Mbps. The largest packet size (based on MSDU is 1500 bytes) will be used under ideal channel conditions (BER=0), and smaller packet sizes (corresponding to smaller MSDU sizes in the set above) will be used in degraded channel conditions (BER above 0).

One example uses, F=0.64. This was designed such that the relationship holds precisely for the ideal case (BER=0 and MSDU size is 1500 bytes), where the sending rate (at MAC level) is 4 Mbps, and expected bandwidth is approximately 6.25 Mbps.

The technique illustrates in FIGS. 36A-I look-up tables designed using the methodology incorporating the dependency of the available bandwidth on the channel condition previously described. The set of optimal MSDU sizes, in this case, is the following subset:
{1500, 1200, 1000, 900, 600, 400, 300, 200, 100}.

In specific cases, it may be more desirable to use a single two-dimensional look-up table instead of a set of one-dimensional look-up tables.

Note again that the table look-up implementation allows any design methodology, including but not limited to the particular techniques described herein. Furthermore, the table design and calculations can be performed off-line. The on-line adaptation process would therefore consist mainly of table look-up operations.

The design of the adaptation look-up table(s) depends on the set of MSDU sizes used, as well as on the number of packets per burst M, and inter-burst interval. The set of MSDU sizes may differ for different network types and perhaps for different implementations of network equipment. It is expected that this set can be fixed during product development in all applications. The choice of M and $\Delta T$ depends mostly on the maximum rate used for streaming audio/video data. In some applications, this is also fixed during product development. In all such cases, the look-up tables can be constructed entirely off-line. In cases where the audio/video streaming bit rate is not known a priori, the application may have to make a choice of M and $\Delta T$ just prior to starting a streaming session. The actual look-up table can be constructed at that time as well, prior to streaming. In other cases, there may be a range of bit rates known at product development time, in which case a set of look-up tables as for example in the above can be pre-computed applicable to a few typical bit rate values and pre-stored in the product.

In another embodiment, only a table with expected bandwidth values, such as shown in FIG. 34, is pre-stored in the device. In this case, the adaptation look-up tables are not stored in the device. Rather, the packet selection process is performed on-line on the basis of FIG. 34 and as prescribed by $$\left| \frac{P \cdot M}{\Delta T} - F \cdot H'(P, BER) \right|.$$

This technique has low computational complexity and is suitable for a fast implementation.

In one implementation, data from the sender to the receiver is transported using UDP and IP over the 802.11 MAC. Therefore the 802.11 MAC payload (the MSDU) contains a 20 byte IP header and an 8 byte UDP header. The system may include in the UDP payload a packet sequence number and burst sequence number. These are used to detect packet losses at the receiver, and to detect the first and last packets in a burst. In some cases, the burst sequence number may be derived from the packet sequence number at the receiver. In that case, the burst sequence number does not have to be included in each packet. In the current implementation, the number of packets per burst is constant for the duration of an audio/video stream.

An alternative design would be to use RTP (Real-time Transport Protocol) over UDP/IP. RTP headers already contain packet sequence numbers, and provide other functionality as well.

In one implementation, a feedback packet from the receiver to the sender is transported using UDP and IP over the 802.11 MAC. The payload contains the estimate of available bandwidth computed at the receiver. It also contains an indicator of whether packet loss was detected in the recent packet burst(s).

An alternative design may use RTCP (Real-Time Control Protocol) to provide feedback messages from receiver to sender. RTCP is a companion protocol to RTP. RTCP provides Quality-of-Service related feedback information to participants of an RTP session, in the form of so-called Sender Reports and Receiver Reports.

It is to be generally understood that the payload of the feedback packet may also contain the value of the packet size or payload size, which corresponds to the size of the packets used to estimate the bandwidth at the receiver. This helps ensure that the sending rate adaptation process has the correct (pack size, bandwidth) tuple to index into the packet size adaptation tables. Moreover, the packet size adaptation technique may be implemented at the receiver rather than at the sender. In such a case, the feedback packet may contain the computed new packet or payload size for the following transmissions, as computed by the rate adaptation process.

In some embodiments, a bandwidth value may be computed at the receiver, which is subsequently communicated to the sender, and the rate adaption process is performed at the sender side. In other embodiments, the receiver may use the computed bandwidth value directly to compute a new packet and/or payload size and/or timing between packets (or bursts) to be used for subsequent packet transmissions. In such a case, the new packet and/or payload size and/or timing between packets (or bursts) is communicated to the sender, rather than the estimated bandwidth value. In general it is to be understood that the process of sensing measurements, computing a bandwidth value on the basis of such measurements, computer other quantities indicative of the condition of the wireless channel, performing rate adaptation, computing packet sizes, computing number of packets in a burst, computing the time between packets and between bursts, can be performed either at the receiver or the receiver, or a combination of the two. One consideration that may be used to select where the measurements and processing is undertaken is the computation resources available to the sender and/or receiver, as well as the expected conditions of the wireless channel and the available bandwidth.

An example of the operation of the rate adaptation scheme is now illustrated. The bandwidth estimation, feedback, and rate adaptation modules may be implemented in software modules. These software modules may function on two Windows 2000 laptops (one sender/server, and the other receiver/client). Each laptop may be equipped with 802.11b client adapters, configured in the ad-hoc networking mode of 802.11 and communicating using the 802.11b DCF. Data is transported using UDP and IP over 802.11b.

In this example, parameters were identical as for the look-up table example design provided above. The number of packets per burst M is 10. The time interval between bursts is 30 msec. The maximum MSDU size was 1500 bytes (payload of 1472 bytes), and during adaptation MSDU sizes are selected from the set {1500, 1200, 1000, 900, 600, 400, 300, 200, 100}. Therefore the maximum sending rate was 4 Mbps, while the minimum sending rate was 0.267 Mbps. The set of look-up tables as included above were used by the sender. Bandwidth estimates are computed at the receiver and sent back to the sender.

In this example, the laptops were initially positioned near each other. After approximately 5 sec, the distance between the laptops was increased (by pushing a rolling cart carrying one of the laptops), up to about 25 m. The speed was about 1 m/sec. After approximately 55 seconds from the start of the experiment, the distance between the two laptops was decreased, until the initial position. The experiment lasted about 90 sec, as was the duration of the data stream. In this example, the 802.11b cards were configured in Auto Rate Fallback mode, which allows the card to switch data link rates depending on channel conditions. Transmission power was set to 1 mW. Together, these conditions caused the sending/receiving stations to experience degraded channel conditions.

Figure 37:
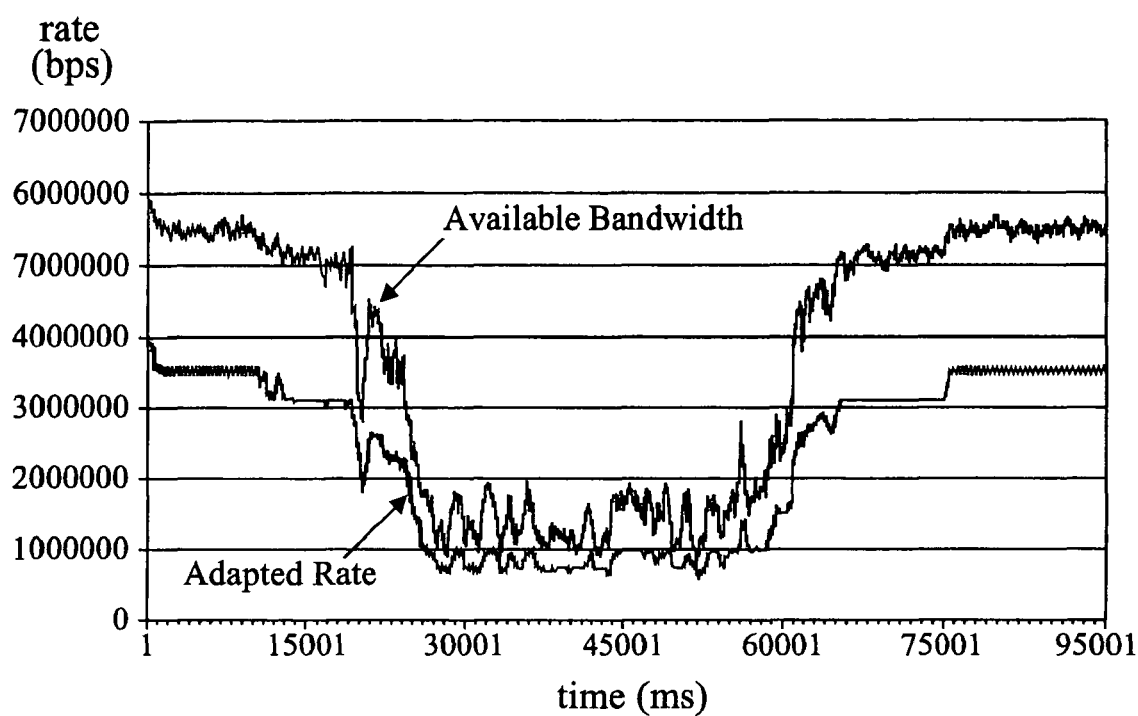
FIG. 37 illustrates the operation of the sending rate adaptation scheme.

The resulting measurements of available bandwidth (as reported by the receiver) as well as the adapted sending rate are shown in FIG. 37. As illustrated in FIG. 37, the original samples of the sending rate (one per burst) were smoothed in a similar way as samples of available bandwidth were during estimation. The graph shows that the rate was adapted successfully to remain below the estimated available bandwidth at all times.

It is also to be understood that the wireless channel may be characterized and the data transmitted through the wireless channel may be characterized based upon other criteria, such as for example, the signal to noise ratio. In this manner, the rate adaptation techniques, the packet size adaptation, the spacing determinations, and the number of packet determinations may be based, at least in part, on these other characteristics, such as the signal to noise ratio.

All references cited herein are incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for transmitting data comprising:
   (a) defining a first average rate to transmit a first plurality of packets of said data from a sender to a receiver;
   (b) defining a second average rate to transmit a second plurality of packets of said data from said sender to said receiver, said second plurality of packets comprising a subset of said first plurality of packets, wherein said second plurality of packets is less than said first plurality of packets, wherein said second average rate is greater than said first average rate;
   (c) transmitting said second plurality of packets from said sender to said receiver over a wireless interconnection;
   (d) estimating the bandwidth of said wireless interconnection;
   (e) inferring a condition of said wireless interconnection based upon said bandwidth, where said condition is at least one of a bit error ratio and a packet error ratio; and
   (f) modifying the amount of data contained in packets to be transmitted across said wireless interconnection based upon said condition.

2. The method of claim 1 wherein said second plurality of packets are provided to said sender at the maximum rate.

3. The method of claim 1 wherein said second plurality of packets are provided as a burst of packets with at least two packets transmitted without additional data being transmitted between them in a back-to-back fashion.

4. The method of claim 1 wherein said wireless interconnection is 802.11 compliant.

5. The method of claim 1 wherein said second plurality of packets is free from including packets not comprising audio and video data.

6. The method of claim 1 wherein said second plurality of packets is transmitted in a duration less than 1 second.

7. The method of claim 1 wherein said transmitting is by an APPLICATION LAYER.

8. The method of claim 1 wherein said inferring is based upon a table of data.

9. The method of claim 1 wherein said second plurality of packets is a burst and said first plurality of packets is not a burst.

10. A method for transmitting data comprising:
    (a) defining a first average rate to transmit a first plurality of packets of said data to a receiver;
    (b) defining a second average rate to transmit a second plurality of packets of said data to said receiver, said second plurality of packets comprising a subset of said first plurality of packets, wherein said second plurality of packets is less than said first plurality of packets, wherein said second average rate is greater than said first average rate;
    (c) transmitting said second plurality of packets from a transmitter to said receiver over a wireless interconnection;
    (d) measuring with a processing device, the bandwidth of a wireless interconnection between said transmitter and said receiver;
    (e) inferring a condition of said wireless interconnection based upon said bandwidth, where said condition is at least one of a bit error ratio and a packet error ratio; and
    (f) modifying the amount of data contained in packets to be transmitted across said wireless interconnection based upon said condition.

11. The method of claim 10 wherein said amount of data is reduced if said bandwidth decreases.

12. The method of claim 10 wherein said amount of data is increased if said bandwidth increases.

13. The method of claim 10 wherein said bandwidth is based upon a packet error ratio.

14. The method of claim 10 wherein said bandwidth is based upon a bit error ratio.

15. The method of claim 10 wherein said bandwidth is based upon a signal to noise ratio.

16. The method of claim 10 wherein said inferring is based upon a table of data.

17. A method for transmitting data comprising:
(a) defining a first average rate to transmit a first plurality of packets of said data to a receiver;
(b) defining a second average rate to transmit a second plurality of packets of said data to said receiver, said second plurality of packets comprising a subset of said first plurality of packets, wherein said second plurality of packets is less than said first plurality of packets, wherein said second average rate is greater than said first average rate;
(c) transmitting said second plurality of packets from a transmitter to said receiver over a wireless interconnection;
(d) measuring with a processing device, the capacity to transmit packets across a wireless interconnection between said transmitter and said receiver;
(e) inferring a condition of said wireless interconnection based upon said capacity, where said condition is at least one of a bit error ratio and a packet error ratio; and
(f) modifying the amount of data contained in packets to be transmitted across said wireless interconnection based upon said condition.

18. The method of claim 17 wherein said amount of data is reduced if said capacity decreases.

19. The method of claim 17 wherein said amount of data is increased if said capacity increases.

20. The method of claim 17 wherein said inferring is based upon a table of data.

21. A method for transmitting data comprising:
(a) defining a first average rate to transmit a first plurality of packets of said data to a receiver;
(b) defining a second average rate to transmit a second plurality of packets of said data, said second plurality of packets comprising a subset of said first plurality of packets, wherein said second plurality of packets is less than said first plurality of packets, wherein said second average rate is greater than said first average rate;
(c) transmitting said second plurality of packets from a transmitter to said receiver over a wireless interconnection;
(d) measuring with a processing device, a current estimate of the capacity to transmit packets across a wireless interconnection between said transmitter and said receiver; and
(e) modifying the amount of data contained in packets to be transmitted across said wireless interconnection, said amount based upon said current estimate and based upon at least one past estimate of said capacity of said wireless interconnection measured prior to said current estimate.

22. The method of claim 21 wherein said amount of data is reduced if said capacity decreases.

23. The method of claim 21 wherein said amount of data is increased if said capacity increases.

24. The method of claim 21 wherein said amount of data is reduced if said capacity has decreased over a temporal time period of 1 second.

25. The method of claim 21 wherein said amount of data is increased if said capacity has increased over a temporal time period of 1 second.

26. The method of claim 21 wherein said modifying is based upon a table of data.

27. A method for transmitting data comprising:
(a) defining a first average rate to transmit a first plurality of packets of said data to a receiver;
(b) defining a second average rate to transmit a second plurality of packets of said data, said second plurality of packets comprising a subset of said first plurality of packets, wherein said second plurality of packets is less than said first plurality of packets, wherein said second average rate is greater than said first average rate;
(c) transmitting said second plurality of packets from a transmitter to said receiver over a wireless interconnection;
(d) estimating with a processing device, an estimate of the capacity to transmit packets across a wireless interconnection between said transmitter and said receiver; and
(e) modifying the amount of data contained in packets to be transmitted across said wireless interconnection, said amount based upon said estimate and based upon a delay in estimating said estimate of said capacity of said wireless interconnection and subsequently sending data across said wireless interconnection based on said estimate.

28. The method of claim 27 wherein said amount of data is reduced if said capacity decreases.

29. The method of claim 27 wherein said amount of data is increased if said capacity increases.

30. The method of claim 27 wherein said modifying is based upon a table of data.

* * * * *